United States Patent [19]

Chennault

[11] Patent Number: 5,930,774
[45] Date of Patent: Jul. 27, 1999

[54] METHOD AND COMPUTER PROGRAM FOR EVALUATING MUTUAL FUND PORTFOLIOS

[75] Inventor: William C. Chennault, Kansas City, Kans.

[73] Assignee: Overlap, Inc., Olathe, Kans.

[21] Appl. No.: 08/593,656

[22] Filed: Jan. 29, 1996

[51] Int. Cl.$^6$ .................................................. G06F 17/60
[52] U.S. Cl. ............................................. 705/36; 705/35
[58] Field of Search ................................... 705/1, 35, 36

[56] References Cited

U.S. PATENT DOCUMENTS 5,784,696  7/1998  Melnikoff .................................. 705/36
5,819,238  10/1998 Fernholtz ................................. 705/36

*Primary Examiner*—Edward R. Cosimano
*Attorney, Agent, or Firm*—Hovey, Williams, Timmons & Collins

[57] ABSTRACT

A computer-readable storage device for storing computer programs for operating a computer is disclosed. The computer-readable storage device includes a computer program stored thereon which directs or operates a computer for evaluating and comparing investment portfolios. The computer program analyzes one or more investment portfolios and determines the extent of diversity or lack of diversity among several investment portfolios each including several securities.

14 Claims, 7 Drawing Sheets

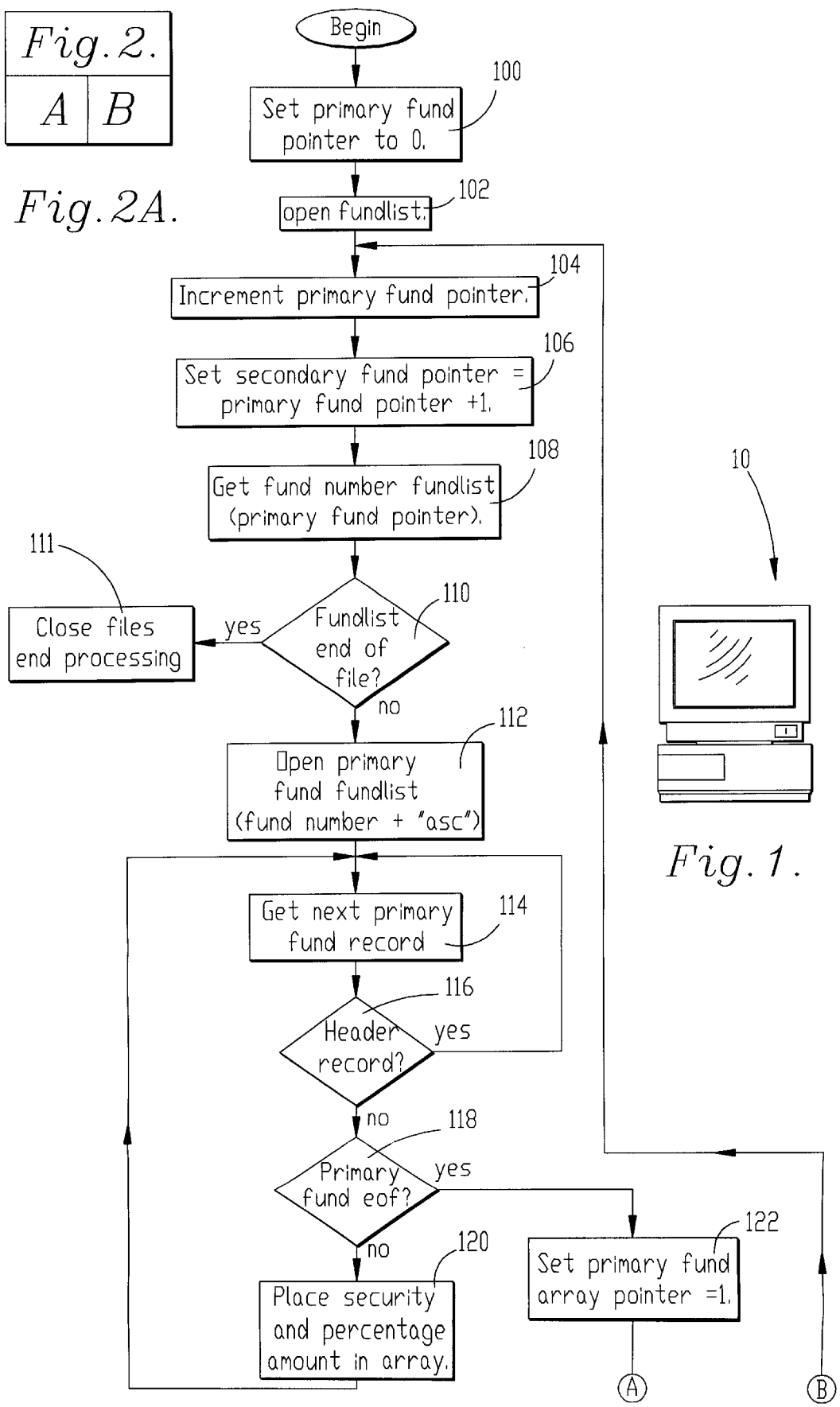

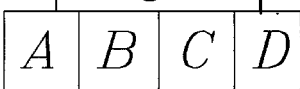
Fig. 3.
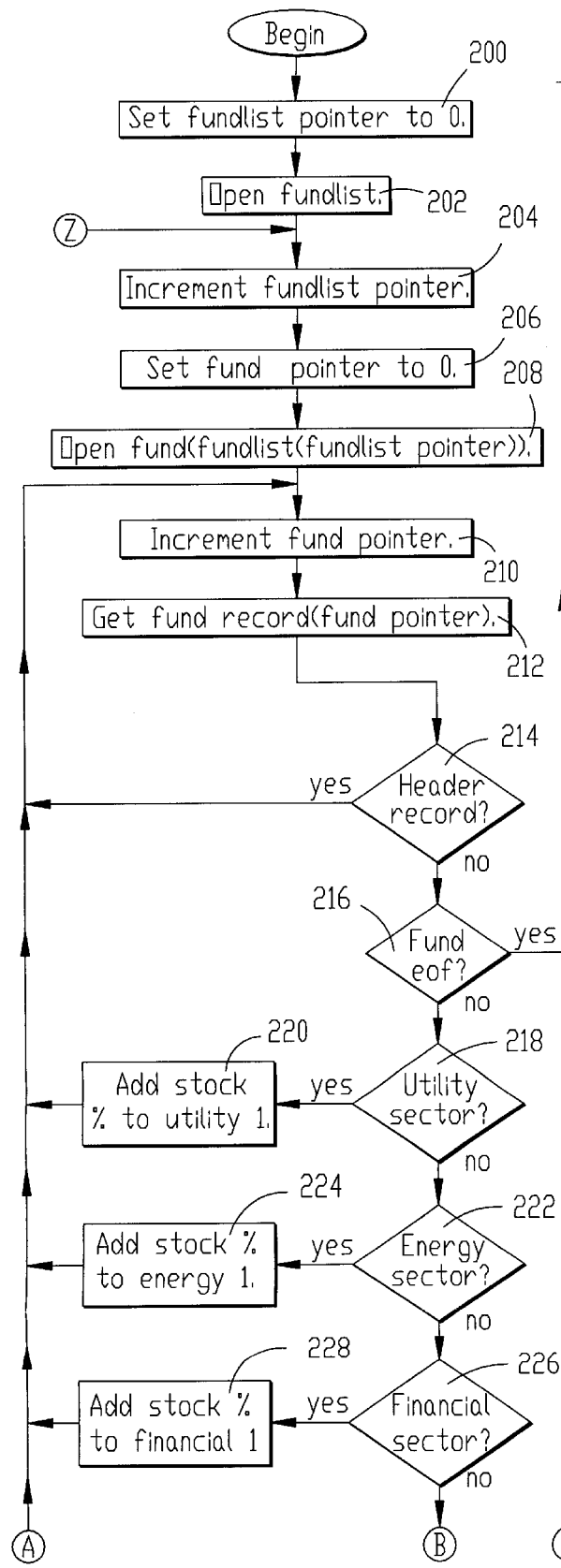
Fig. 3A.
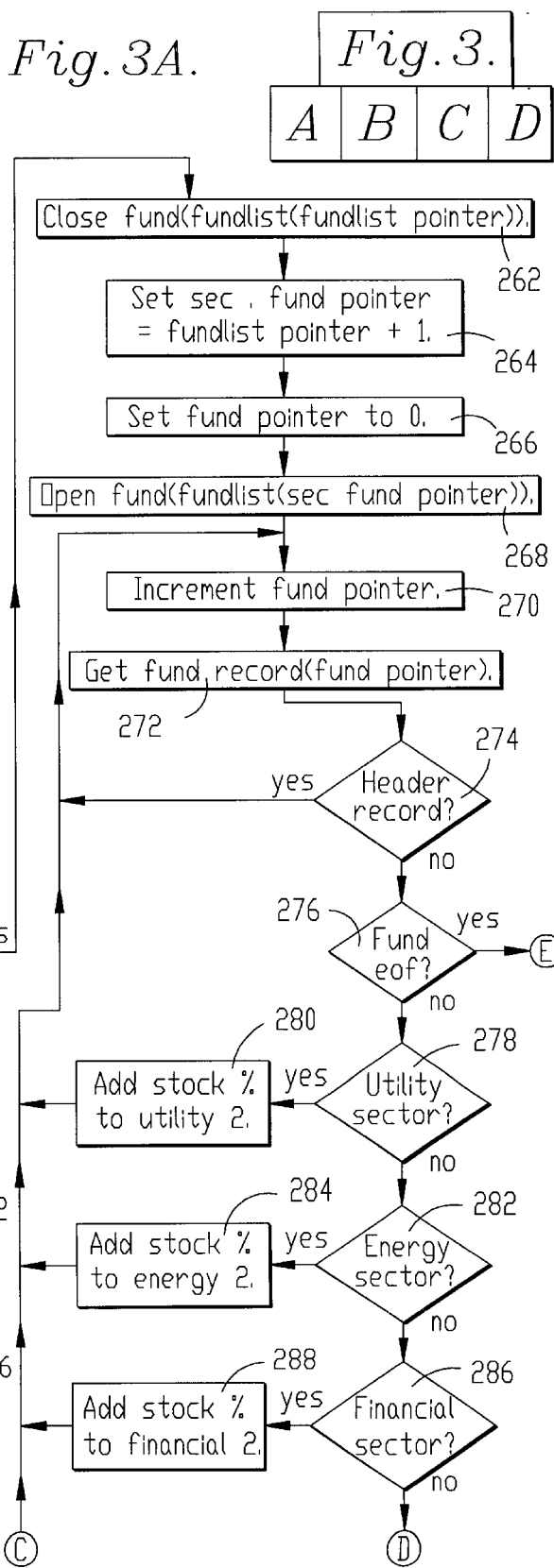

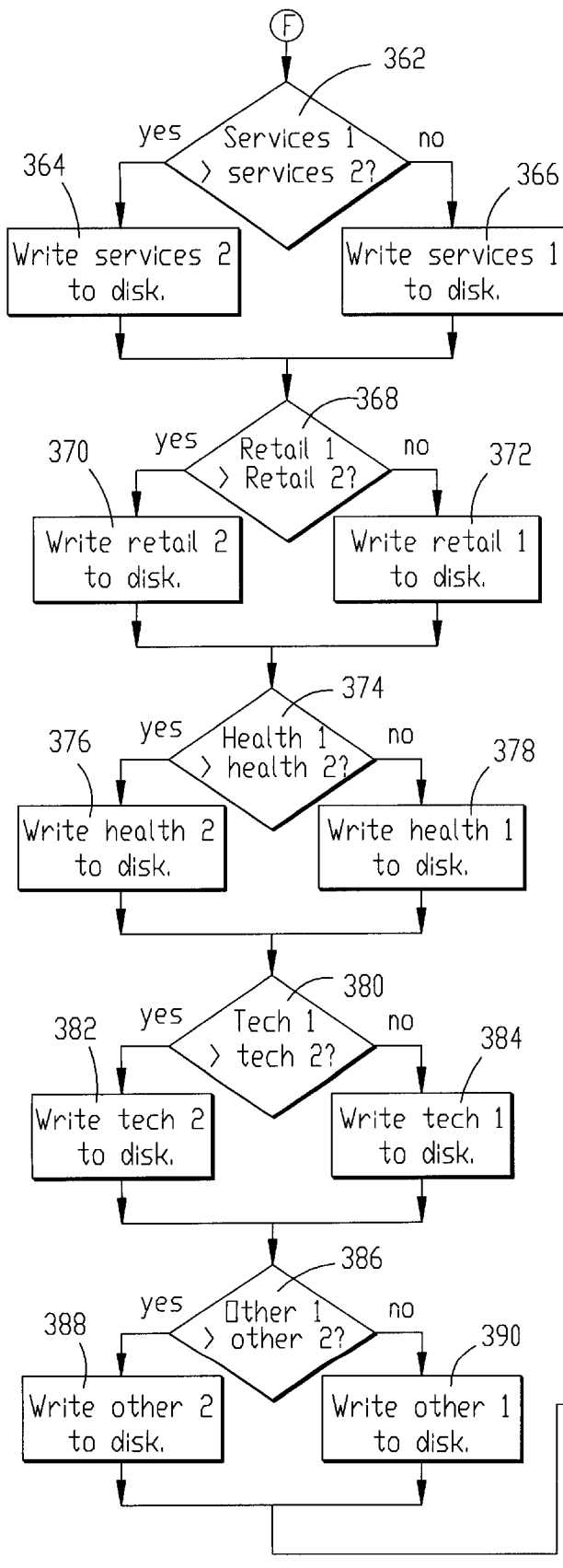
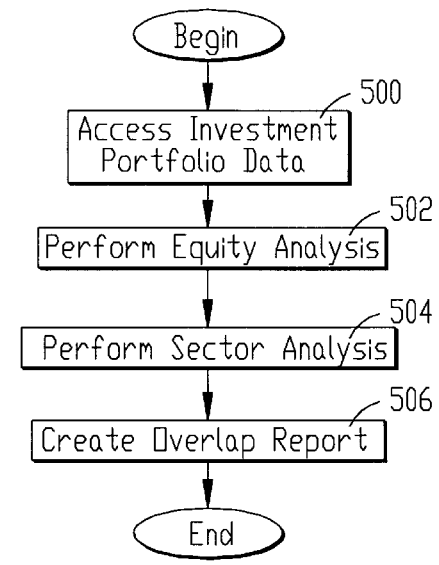
Fig.5.
Fig.3D.
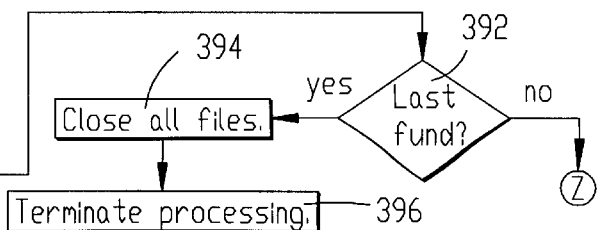

METHOD AND COMPUTER PROGRAM FOR EVALUATING MUTUAL FUND PORTFOLIOS

SOURCE CODE APPENDIX

An appendix containing the source code of the computer program of the present invention is appended hereto.

BACKGROUND OF THE INVENTION

1. Field of the Invention

The present invention relates to computer-readable storage devices for storing computer programs for operating computers. More particularly, the invention relates to a computer program for evaluating or comparing two or more investment portfolios each including several securities to determine the extent of diversity or lack of diversity between the investment portfolios.

2. Description of the Prior Art

Shares of over 3,600 separate equity-invested mutual funds are available to be purchased by the investing public. There are also thousands of available money market funds, debt-invested mutual funds, mortgage funds and other publicly held investment portfolios. In general, each mutual fund holds an ever changing portfolio of investments in securities issued by many different companies. An individual investor generally chooses to buy shares of a mutual fund to obtain the advantages of professional management of the mutual fund's investments and to gain diversification by owning a portion of all the various securities held by the mutual fund.

Diversification is a primary investment goal because: (1) it substantially reduces the investor's risks associated with reductions in the values of individual companies' securities and of the values of companies which do business primarily in a specific sector of the economy; and (2) it increases the possibility that the investor will participate in the ownership of companies whose securities increase in value. Because a mutual fund holds securities issued by many companies which do business primarily in different sectors of the economy, the investor achieves the advantages of investment diversification by buying shares of the mutual fund.

Many individual investors attempt to further diversify their investments by buying shares in two or more mutual funds. However, this often does not increase diversification as much as expected because many mutual funds hold investments in the same securities. For example, many mutual funds hold shares of General Motors stock. An individual investor does not increase the diversification of his or her investments by buying shares in two mutual funds to the extent that both mutual funds hold investments in the same securities. For example, there is no diversity to the extent that both mutual funds hold shares of General Motors stock.

Similarly, many mutual funds hold securities issued by various companies which do business primarily in the same sector of the economy. For example, General Motors and Ford both do business primarily in the "cyclicals" sector of the economy. An individual investor does not increase the diversification of his or her investments among economic sectors by buying shares in two mutual funds to the extent that both mutual funds hold investments in companies which do business primarily in the same sector of the economy. For example, there is no economic sector diversity to the extent the first mutual fund holds General Motors stock and the second mutual fund holds Ford stock.

Every mutual fund is required by law to regularly report, among other things, the identity, character and amount of the specific securities held in its portfolio as of an indicated date. These reports are public and are available to individual investors. A private business called "Morningstar" compiles from these public reports, publishes and sells to the public a monthly computer-readable report (called the "Morningstar Ondisc" report), which sets out the details of the most recently reported portfolios of over 6,000 mutual funds. The Morningstar Ondisc report includes for each mutual fund: (1) the percent which the market value of each security held by the mutual fund bears to the portfolio's total market value (the "Security Percent" for each security); and (2) the sector of the economy in which each company whose securities are held by the mutual fund primarily does business.

However, neither the Morningstar Ondisc report nor any other source provides any comparison of the attributes which any mutual fund's investments have in common with any other mutual fund's investments. These common "attributes" include the extent that both mutual funds hold investments in the same securities or the extent that both mutual funds hold investment securities issued by companies which do business primarily in a particular sector of the economy. Furthermore, the enormity of individual calculations involved in analyzing the common features of even a few mutual fund portfolios makes any attempt at manual calculation impossible.

Accordingly, there are no known methods or computer programs that allow an individual investor to determine the extent of diversity of investment obtained by purchasing shares of two or more designated mutual funds. Also, an individual is not now able to search information about various mutual funds' investment attributes in order to locate one or more mutual funds which meet the investor's specific criteria for diversification of investments, as compared to a mutual fund already owned by the investor.

OBJECTS AND SUMMARY OF THE INVENTION

In view of the foregoing, it is an object of the present invention to provide a method and computer program for evaluating one or more investment portfolios each including several securities.

It is another object of the present invention to provide a method and computer program for comparing the investment attributes of several investment portfolios and for identifying common investment attributes.

It is another object of the present invention to provide a method and computer program for measuring the extent of diversity or lack of diversity among several investment portfolios by comparing the investment portfolios for common investment attributes.

It is another object of the present invention to provide a method and computer program for comparing the securities owned by two or more investment portfolios and for identifying securities that are held by more than one of the investment portfolios.

It is another object of the present invention to provide a method and computer program for determining the extent that two or more investment portfolios are invested in the same sector of the economy.

It is another object of the present invention to provide a method and computer program for determining the extent that two or more investment portfolios are invested in the same country.

It is another object of the present invention to provide a method and computer program for accessing specific information about designated mutual funds from a Morningstar Ondisc report and for using that information to create a new data base of proprietary information.

It is a more specific object of the present invention to provide a method and computer program which, for every combination of two mutual funds included in the created proprietary data base: (a) accesses the percent which the market value of each security held by each mutual fund bears to the total market value of that mutual fund's portfolio (a "Security Percent"); and (b) compares the Security Percents for each and every security which is held by both mutual funds and accumulates and retains in the new data base the aggregate of the smaller percent from all of those comparisons as the "Equity Overlap" of those two mutual funds.

It is another object of the present invention to provide a method and computer program which, for every combination of two mutual funds included in the new data base: (a) calculates the percent which the market value of all securities issued by companies which do business primarily in a designated sector of the economy held by each mutual fund bears to the total market value of that mutual fund's portfolio (a "Sector Percent"); and (b) compares each mutual fund's Sector Percent for each sector of the economy and accumulates and retains in the new data base the smaller percent for each sector of the economy as that sector's "Sector Overlap" of those two mutual funds.

It is another object of the present invention to provide a method and computer program which creates a separate, duplicatable, computer-readable "Overlap Report" which includes: (a) specific information about each mutual fund in the new data base; (b) the Equity Overlap percent for every combination of two mutual funds in the new data base; (c) a Sector Overlap percent for every sector of the economy for every combination of two mutual funds in the new data base; and (d) preprogrammed user inquiry programs which allow a user to access this information in various ways.

It is another object of the present invention to provide a separate, operable computer program (the "Overlap Report") which is installable on virtually any separate DOS or Windows based computer and which can be accessed by the computer's user through inquiry programs included in the Overlap Report, so that the user can: (a) display and print out the identifying information, Equity Overlap percent, and portfolio dates for any two mutual funds in the report designated by the user, including concurrent displays of this data for multiple sets of designated mutual funds; (b) display and print out the identifying information, various Sector Overlap percents, Equity Overlap percent, and portfolio dates for any two user designated mutual funds in the report, including concurrent displays of this data for multiple sets of designated mutual funds; and (c) designate a mutual fund in the report, search the report data, locate, display and print out information for those mutual funds in the report which have an Equity Overlap percent with the designated mutual fund which equals, exceeds or is less than the percent designated by the user.

In view of these objects and other objects that become evident from the description of the preferred embodiments of the invention, a method and computer program for directing a computer for evaluating several investment portfolios each including several securities is provided. The computer program is preferably stored on a computer-readable memory device and broadly includes: access means for accessing a first investment portfolio data record including the investment attributes of a first investment portfolio and for accessing a second investment portfolio data record including the investment attributes of a second investment portfolio; and evaluating means for evaluating the first and second investment portfolios, the evaluating means including investment attribute comparing means for comparing the investment attributes of the first investment portfolio with the investment attributes of the second investment portfolio for identifying matching investment attributes that are common to both of the first and second investment portfolios.

The investment attributes that are compared are the securities owned by the investment portfolios, the extent that the investment portfolios are invested in the same sector of the economy, and the extent that the investment portfolios are invested in the same country. After identifying the matching investment attributes, the computer program determines the extent of diversity or lack of diversity among the investment portfolios by determining the extent that the investment portfolios are invested in the matching attributes. In preferred forms, the computer program is operable for receiving investment information concerning all known stock mutual funds and for determining the extent of diversity between all of the mutual funds.

In preferred forms, the method and computer program of the present invention performs two basic functions:

(1) The "Overlap Compiler" portion of the program: (i) accesses Morningstar Ondisc report data for specific portfolio and other information regarding each mutual fund in a group of many designated mutual funds; (ii) compares the mutual funds to create a new data base of the extent that all combinations of two mutual funds from the group have specific attributes in common; and (iii) creates a duplicable, computer-readable Overlap Report of that new data base, which includes preprogrammed user inquiry programs; and (2) the Overlap Report program, which is transferred onto individual disks which are sold to investors, can be loaded onto an investor's computer and accessed by the investor, with the result that the investor: (i) can determine from the Overlap Report the extent that any two reported mutual funds' investments are diversified (that is, are invested in the same securities or are invested in securities of companies which do business primarily in the same sectors of the economy); and (ii) can search the Overlap Report for and locate reported mutual funds which have the investor designated degree of diversity from the mutual fund or funds already owned by the investor. Furthermore, the Overlap Report allows the user to simultaneously access and compare many different combinations of two mutual funds for diversification under (i) above, and to print out all of those comparisons in one report.

The present invention can be readily adapted to change or expand the attributes which can be accessed from the Morningstar Ondisc report, subjected to the proprietary calculations, and reported on through the Overlap Report. For example, the Overlap Compiler could be readily expanded to include a calculation of the extent that all combinations of two mutual funds in a group of mutual funds hold investments in securities issued by companies which do business primarily in specific foreign countries. Similarly, the Overlap Report could be readily expanded to include an investor's ability: (1) to search for and determine the extent that any two mutual funds each holds investments in securities issued by companies which do business primarily in designated foreign countries: and (2) to search the Overlap Report to locate and report on mutual funds which have an investor designated degree of investments in securities of companies which do business primarily in a designated foreign country as compared with a mutual fund already owned by the investor.

The present invention is also readily adaptable to access any accumulation of investment portfolio information acquired from any source (then perform the above-described calculations and create the reports described above). That is, the Overlap Compiler can be adapted to access portfolio information from sources other than the Morningstar Ondisc report, such as from manual data entries, or from other computer readable sources. Likewise, the accessed information could contain information for portfolios of organizations other than equity-invested mutual funds, such as information about debt-invested mutual funds, Fannie May-type mortgage funds, pension plan funds, charities' investments, all types of trusts, individual investors' portfolios, or portfolios of any other entity which holds more than two securities.

Furthermore, the present invention utilizes a unique and novel methodology (including the new "Sum of Lesser Amounts" algorithm discussed below) to calculate and compile data and to create the Overlap Report. The method utilizing the Sum of Lesser Amounts algorithm is readily suitable to many other applications which involve the comparisons of various attributes of individual components of two or more compilations of similar numerical information. That is, this methodology is readily suitable to calculate, compile and report on the extent that all combinations of two compilations in any data base of two or more individual compilations of similar numerical information have specific user designated attributes of their respective components in common. For example, the present invention could be readily adapted to compare common attributes of the results of individual repetitions of a scientific experiment, or of individual baseball players' statistics, or of sales results of various marketing plans, or of populations and infrastructures of different cities, etc.

Likewise, the methodology of the present invention is readily suitable to access any data base of a group of two or more individual compilations of similar numerical information, and to calculate, compile a new data base, search for and report on those compilations which meet, exceed, or are less than the user designated attributes of a user designated individual compilation chosen from that group. For example, the program could create and search a new data base for, and report on all individual repetitions of an experiment which produced a user designated result which was equal to, greater than, or less than a result produced by a user designated repetition of the experiment.

By providing a method and computer program as described herein, many advantages are realized. For example, by providing a method and computer program for evaluating investment portfolios and for identifying matching investment attributes, investors can accurately and quickly identify investment portfolios that have similar or dissimilar investment strategies. Thus, the present invention allows investors to make knowledgeable decisions when selecting and buying investment portfolios.

Additionally, by providing a method and computer program for measuring the diversity or lack of diversity between two or more investment portfolios, investors can accurately and quickly determine the degree to which several investment portfolios are diversified. Thus, investors can select and purchase a group of investment portfolios that together form the desired extent of diversity.

Additionally, by providing a method and computer program that determines the extent that two or more investment portfolios are invested in the same sector of the economy, investors can more accurately pick investment portfolios that are invested or not invested in desired sectors. For example, many investors wish to own mutual funds that are heavily invested in technology stocks because these funds have historically provided good rates of return. With the present invention, investors can accurately select two or more funds with a low technology sector diversity for meeting these goals.

Similarly, by providing a method and computer program that determines the extent that two or more investment portfolios are invested in securities issued by companies which do business primarily in the same country, investors can more accurately select or avoid investment portfolios that invest in particular countries.

Specifically, an investor can use the Overlap Report to compare the degree of diversity of investments, by securities (the Equity Overlap) and by sectors of the economy (the Sector Overlaps) held in mutual funds already owned by the investor. Depending on the investor's individual requirements for diversity, this information helps the investor make better decisions about buying, selling or retaining shares of reported mutual funds.

Moreover, an investor can use the Overlap Report to locate reported mutual funds which have an investor designated degree of diversity (the Equity Overlap) from the mutual funds already owned by the investor. This helps the investor make better buying decisions.

BRIEF DESCRIPTION OF THE DRAWING FIGURES

A preferred embodiment of the present invention is described in detail below with reference to the attached drawing figures, wherein:

FIG. 1 is a schematic view of a computer for running the computer program of the present invention;

FIG. 2 is a flow chart illustrating the equity analysis portion of the computer program;

FIG. 2A is a portion of the flow chart of FIG. 2;

FIG. 3 is a flow chart illustrating the sector analysis portion of the computer program;

FIG. 3A is a portion of the flow chart of FIG. 3;

FIG. 3D is a continuation of FIG. 3C;

FIG. 5 is a flow chart illustrating the overlap compiler of the present invention.

DETAILED DESCRIPTION OF THE PREFERRED EMBODIMENTS

Figure 2B:
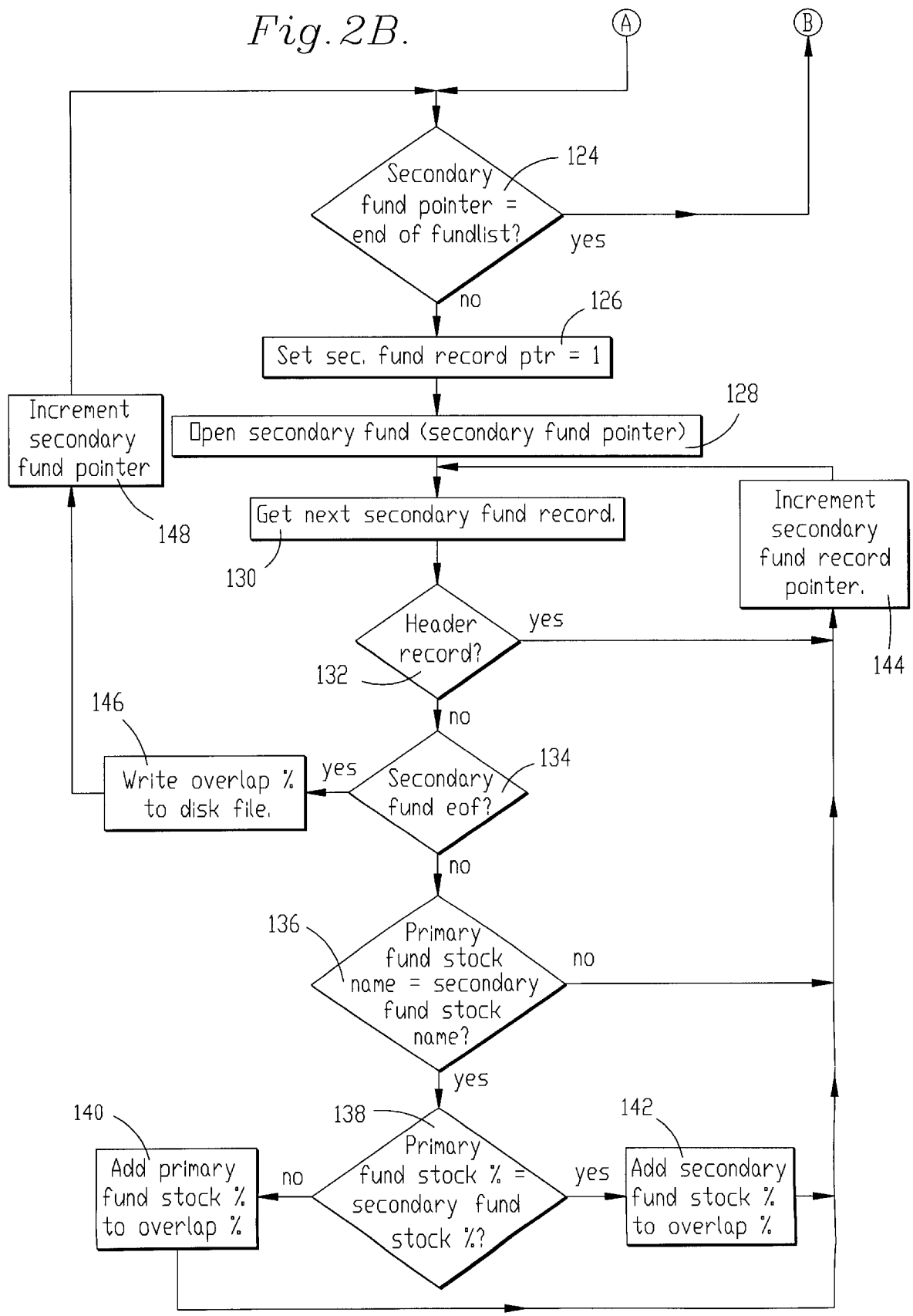
FIG. 2B is a continuation of FIG. 2A.

The computer program of the present invention is provided for directing or operating a computer for evaluating several investment portfolios each including several securities. As used herein, the term "investment portfolios" is understood to include all types of investment funds that have several individual securities, including stock mutual funds, bond mutual funds, and money market funds.

As illustrated generally in FIG. 1, the computer program preferably operates an IBM compatible or similar type microcomputer 10 having a conventional Pentium type microprocessor, one or more disk drives, ROM and RAM memory, and a display terminal. Those skilled in the art will appreciate that the computer program may be used with any type of computer including microcomputers, minicomputers, or main frame computers.

The computer program is stored on a computer-readable memory device such as a floppy disk, 3.5" disk, tape, compact disk, or the computer's hard drive and may be written in any computer language, including C+. The source code for the computer program is reproduced in the attached Source Code Appendix and is described herein with reference to the flow charts of FIGS. 2A, 2B, 3A, 3B, 3C, 3D, 4 and 5.

Referring to FIG. 5, the computer program generally performs the following functions, as shown in steps 500, 502, 504, 506: First as shown in step 500, the Overlap Compiler accesses specific information, such as name, portfolio date, load or no-load data, etc., about designated mutual funds from a Morningstar Ondisc report or other compilations of mutual fund data. The Overlap Compiler then uses this information to create a new data base on a preprogrammed format.

Second, as shown in step 502 the Overlap Compiler: (a) selects the first two mutual funds in the new data base; (b) utilizes the Sum of Lesser Amounts algorithm described below and other programs to access or calculate from the Morningstar Ondisc report each selected mutual fund's Security Percent (the percent which the market value of a security held by a selected mutual fund bears to the total market value of that mutual fund's portfolio) for each security which is held by both mutual funds, to compare the Security Percents for each such security, and to accumulate and retain in the new data base the aggregate of the smaller percent from all of those comparisons as the "Equity Overlap" percent of those two mutual funds; and (c) repeats steps (a) and (b) until an Equity Overlap percent is created for all combinations of two mutual funds in the new data base. The term "security" refers to all shares of a specific class of security issued by a specific company. For example, each class of common or preferred stock issued by a company is a separate security. Because the Morningstar Ondisc report includes Security Percents for all securities held by each fund, the Overlap Compiler does not have to calculate these percents; however, if the Overlap Compiler accesses some other source of portfolio information which does not include these percents, the Overlap Compiler can be readily expanded to calculate a Security Percent for each security which is held by both of the two mutual funds being compared.

Third, as shown in step 504 the Overlap Compiler: (a) selects the first two mutual funds in the new data base; (b) utilizes proprietary calculations to calculate from the data on the Morningstar Ondisc report each selected mutual fund's Sector Percent (the percent which the market value of all securities issued by companies which do business primarily in a designated sector of the economy held by each selected mutual fund bears to the total market value of that mutual fund's portfolio) for each sector of the economy, to compare the Sector Percents for each such sector, and to accumulate and retain in the new data base the smaller percent for each sector of the economy from each of those comparisons as that sector's "Sector Overlap" percent of those two mutual funds; and (c) repeats steps (a) and (b) until a Sector Percent for each sector of the economy is created for all combinations of two mutual funds in the new data base. The term "sector of the economy" refers to the securities held by the mutual fund which are commonly classified as issued by companies which do business primarily in one sector of the economy. For example, companies are now commonly classified as doing business primarily in one of the following "sectors" of the economy: utilities, energy, financial, cyclicals, consumer durables, consumer staples, services, retail, health, technology, and other. The Morningstar Ondisc report assigns a sector of the economy to each security in each mutual fund's portfolio, and the Overlap Compiler adds the Security Percents for all securities assigned a specific sector of the economy to determine the Sector Percent for that sector; however, if the Overlap Compiler accesses some other source of portfolio information which does not include Security Percents, the Overlap Compiler can be readily expanded to calculate each Sector Percent by adding the market values of all securities assigned to a specific sector of the economy and dividing that total by the portfolio's total market value.

Fourth, as shown in step 506, the Overlap Compiler creates a separate, duplicatable, computer-readable "Overlap Report" which includes: (a) specific information about each mutual fund in the new data base; (b) the Equity Overlap percent for every combination of two mutual funds in the new data base; (c) a Sector Overlap percent for every sector of the economy for every combination of two mutual funds in the new data base; and (d) preprogrammed user inquiry programs which allow a user to access this information in various ways. Copies of the Overlap Report are created and sold to individual investors.

Fifth, the Overlap Report is installable on virtually any separate DOS or Windows based computer and can be accessed by the computer's user through inquiry programs included in the Overlap Report, so that the user can: (a) display and print out the identifying information, Equity Overlap percent, and portfolio dates for any two mutual funds in the report designated by the user, including concurrent displays of this data for multiple sets of designated mutual funds; (b) display and print out the identifying information, Sector Overlap percent for each sector of the economy, Equity Overlap percent, and portfolio dates for any two user designated mutual funds in the report, including concurrent displays of this data for multiple sets of designated mutual funds; and (c) designate a mutual fund in the report, search the report data, locate, display and print out information for those mutual funds in the report which have an Equity Overlap percent with the designated mutual fund which equals, exceeds or is less than the percent designated by the user.

EQUITY ANALYSIS MODULE

The Equity Analysis portion of the Overlap Compiler computer program compares the Security Percents for each security held by both mutual funds for every combination two mutual funds in the data base and creates the "Equity Overlap" percent for each of those combinations. This Equity Overlap represents a quantification, expressed as a percent, of the aggregate common ownership of the same securities by any two mutual funds. In short, the Equity Overlap percent for any two mutual funds is the accumulation of the smaller of the Security Percents for each security held by both mutual funds. This calculation utilizes a new and unique algorithm called Sum of Lesser Amounts.

SUM OF LESSER AMOUNTS

The Sum of Lesser Amounts algorithm is used to calculate and express as a number the extent that any two compilations of similar numerical information have a specific, user designated component or attribute in common with each other. A program which utilizes this algorithm can calculate factors for and compare: (a) individual components; or (b) groups of components which have a common attribute. For example, from two charities' separate lists of individual male and female contributors and the amounts contributed by each, the algorithm can calculate and report on: (a) the extent both charities received contributions from the same individual contributors (a comparison of individual components); or (b) the extent both charities received contributions from male contributors and the extent both charities received contributions from female contributors (a comparison of groups of individual components with common attributes).

In its simplest form, the Sum of Lesser Amounts algorithm: (a) works from a data base which contains two or more described compilations (such as mutual funds) of described components (such as securities) with a number (such as a Security Percent) assigned to each component; (b) accesses the information about the first compilation and the second compilation; (c) locates the first component which is common to both the first and second compilations; (d) compares the first compilation's number assigned to that first common component with the second compilation's number assigned to that component; (e) selects and retains the smaller of those two numbers as the Sum of Lesser Amounts for the relationship between the common components of the first compilation and the second compilation; (f) locates the second component which is common to both the first and second compilations; (g) compares the first compilation's number assigned to that second common component with the second compilation's number assigned to that component; (h) selects and adds the smaller of those two numbers to the Sum of Lesser Amounts obtained in step (e); (i) repeats steps (f) through (h) for the third and each subsequent component which is common to both the first and second compilations; (j) stores the total of the Sum of Lesser Amounts (obtained from all comparisons of components which are common to both the first and second compilations) as the "Total Overlap" quantity for the primary relationship between the first compilation and the second compilation; (k) accesses the information for the third compilation; (l) locates the first component which is common to both the first and third compilations; (m) compares the first compilation's number assigned to that first common component with the third compilation's number assigned to that component; (n) selects and retains the smaller of those two numbers as the Sum of Lesser Amounts for the primary relationship between the first compilation and the third compilation; (o) locates the second component which is common to both the first and third compilations; (p) compares the first compilation's number assigned to that second common component with the third compilation's number assigned to that component; (q) selects and adds the smaller of those two numbers to the Sum of Lesser Amounts obtained in step (n); (r) repeats step (o) through (q) for through (q) for the third and each subsequent component which is common to both the first and third compilations; (s) stores the total of the Sum of Lesser Amounts (obtained from all comparisons of components which are common to both the first and third compilations) as the "Total Overlap" quantity for the primary relationship between the first compilation and the third compilation; and (t) repeats steps (k) through (s) for every combination of two compilations in the main data base, with the result that a "Total Overlap" quantity is created and stored for the primary relationship between every combination of two compilations in the main data base.

This simple application of the Sum of Lesser Amounts algorithm is used, for example, to create the Overlap Percent for all combinations of two mutual funds, as described above.

In another application, the Sum of Lesser Amounts algorithm can be used to first add the numbers assigned to a compilation's components which have a designated attribute, then compare that total to a similar total obtained for another compilation, with the smaller of those two totals representing the extent both compilations' components have that designated attribute. This second application is used, for example, to create the Sector Percent for each sector of the economy for all combinations of two mutual funds, as described above. It could also be used to calculate the extent any two mutual funds are invested in securities issued by companies which do business primarily in the same foreign country.

There are many other, more complicated possible applications of the Sum of Lesser Amounts algorithm. For example, several groups of persons could be subjects of a scientific experiment, with each person described by sex, age, race, etc. and with the experiment resulting in various numbers (such as cholesterol level, height, weight, etc.) being assigned to each person. The algorithm could be used to calculate the extent that each combination of two groups had the same results, designated by many combinations of sex, age, race, cholesterol level, height, weight, etc.

Referring now to the drawing figures, FIGS. 2, 2A and 2B are flow diagrams summarizing the steps of the Equity Analysis portion or module of the computer program. The flow diagrams of FIGS. 2A and 2B are provided to aid in the understanding of the invention but do not disclose every detail of the computer program reproduced in the attached Source Code Appendix.

Referring to FIG. 2A, the Equity Analysis module begins at step 100 where a "primary fund pointer" is set to 0. This primary fund pointer points to a fund number corresponding to a particular investment portfolio listed in the fund list as described above. Step 102 then opens this fund list for retrieving the investment portfolio information.

Step 104 then increments the primary fund pointer, and step 106 sets a "secondary fund pointer" equal to the primary fund pointer +1. The Equity Analysis module next moves to step 108 which retrieves the fund number from the fund list that is pointed to by the primary fund pointer.

In step 110, the program asks whether the fund number retrieved in step 108 is the last fund number in the fund list. If the answer to step 108 is yes, step 111 ends the Equity Analysis portion of the computer program.

However, if the answer to step 110 is no, the program proceeds to step 112 which opens the data record or file for the investment portfolio pointed to by the primary fund pointer. The investment portfolio pointed to by the primary fund pointer is referred to as the primary fund. As described above, the fund file includes the name of each security in the investment portfolio and the percentage that each security forms of that fund's total assets.

Steps 114–120 then load the contents of this primary fund file from the hard drive of the computer into a memory array in the RAM memory of the computer. Step 116 reads the contents of the primary fund record, if any header information is detected it is discarded and the next record is retrieved in step 114. If Step 116 does not read any header information it proceeds to step 118. Step 118 reads the contents of the record to determine if the end of the file has been reached. If "NO" then the program proceeds to Step 120, which places actual investment information into the memory array. If Step 118 determines the end of the primary fund file has been reached, the program then proceeds to step 122. As illustrated in these steps, header information is discarded so that only actual investment information is loaded into the memory array. Once the contents of the primary fund have been loaded into the memory array, step 122 sets a "primary fund array pointer" equal to 1. Turning to FIG. 2B, the program proceeds to step 124 which determines whether the secondary fund pointer is pointing to the last fund number in the fund list. If the answer to step 124 is yes, the program returns to step 104 in FIG. 2A for performing an equity analysis on a new primary fund.

However, if the answer to step 124 is no, the program continues the Equity Analysis for the first primary fund by advancing to step 126. Step 126 first sets a "secondary fund record pointer" equal to 1. Step 128 then opens the ASCII file for the investment portfolio pointed to by the secondary fund pointer. The investment portfolio pointed to by the secondary fund pointer is referred to as the secondary fund.

Steps 130–134 retrieve individual lines of data from the fund file for this secondary fund from the hard drive of the computer. Since the fund file includes header information identifying the investment portfolio, these steps only access and evaluate the data in the fund file that relates to the securities owned by the fund and their respective asset percentages. Step 132 reads the contents of the secondary fund record, if any header information is detected it is discarded and the program proceeds to step 144 to increment the secondary fund record pointer. The program then retrieves the next line of data in step 130. Each time a non-header fund record is retrieved, step 134 determines whether the last line of data has been read from the secondary fund file.

If the answer to step 134 is no, the program proceeds to steps 136–142 for evaluating and comparing the primary fund with the secondary fund for determining the extent of diversity or lack of diversity between the funds. Particularly, step 136 first compares the names of the securities in the primary fund with the first security retrieved from the secondary fund for determining if there is a match. If the answer to step 136 is no, i.e., none of the securities in the primary fund match this first security in the secondary fund, the program loops to step 144 and then to step 130, which increment the secondary fund record pointer and retrieve a second line of data from the secondary fund file.

However, if the answer to step 136 is yes, step 138 compares the Security Percent that each of these matched securities forms of its respective fund's total assets. If step 138 determines that the primary fund Security Percent is less than the secondary fund Security Percent, step 140 stores this primary fund Security Percent as an "overlap" number. Conversely, if step 138 determines that the primary fund Security Percent is greater than the secondary fund Security Percent, step 142 stores the secondary fund Security Percent as the overlap number.

The program then returns to steps 144 and 130 for incrementing the secondary fund record pointer and retrieving the next line of data from the secondary fund file, respectively. The program continues these steps until the last line of data has been read from the secondary fund file. Each time a new line of data is read from the secondary fund file, it is compared with the securities in the primary fund file. If there is a match between the securities, the percentage overlap is added to the total overlap number in steps 140 and 142.

The following is an example of the results obtained by steps 136–142 of the Equity Analysis module for an exemplary primary fund and a secondary fund:

| PRIMARY FUND | | SECONDARY FUND | | LESSER AMOUNT |
| --- | --- | --- | --- | --- |
| IBM | 15% | Digital | 16% | |
| Ford | 13% | Kmart | 17% | |
| ATT | 17% | Borders | 19% | |
| GM | 4% | GM | 6% | 4% |
| Microsoft | 18% | Sears | 17% | |
| Tandy | 2% | Tandy | 1% | 1% |
| Chrysler | 7% | Chrysler | 5% | 5% |
| Rolhm | 16% | Honeywell | 16% | |
| Hershey | 8% | Hershey | 3% | 3% |
| TOTAL | 100% | | 100% | 13% |
| Sum of Lesser Amounts | | | 13% | |

As shown in the table, each time the Equity Analysis module identifies a security in the secondary fund that is also in the primary fund, it compares the Security Percents that each security forms of its respective fund's total assets. Then, the lesser percentage is added to the overlap number. Thus, in the above example, the Equity Analysis module identifies that both the primary fund and the secondary fund own the securities GM, Tandy, Chrysler, and Hershey. The Equity Analysis module also calculates that the Sum of Lesser Amounts, or total overlap number, is 13%. Thus, the Equity Analysis module determines that the primary fund and the secondary fund have a lack of diversity of 13%, or a diversity of 87%.

Once the Equity Analysis module has compared every security in a secondary fund to every security in the primary fund, it retrieves a new secondary fund for comparing to the primary fund. Thus, if the answer to step 134 above was yes, i.e., the last line of data has been read from the current secondary fund file, the program proceeds to step 146, where the overlap percentage is stored. Step 148 then increments the secondary fund pointer, and the program returns to steps 124–144 for performing a comparison between the primary fund and a new secondary fund. The end result of the operation of the Equity Analysis module is an equity database which compares every investment portfolio in the fund list with every other investment portfolio in the fund list.

SECTOR ANALYSIS MODULE

The Sector Analysis portion of the Overlap Compiler computer program compares two mutual funds' Sector Percents (the percent of each mutual fund's total portfolio which is invested in companies which do business primarily in a designated sector of the economy) for each sector of the economy and selects the smaller percent as the "Sector Overlap" percent for those two funds for that sector, then repeats that calculation for each sector for all combinations of two mutual funds in the data base. Each Sector Overlap percent represents a quantification of two mutual funds' aggregate common ownership of securities issued by companies which do business primarily in the subject sector of the economy (although the securities may not be issued by the same companies). In short, the Sector Overlap percent for a particular sector for any two mutual funds is the smaller of the Sector Percents for those mutual funds for that sector. This calculation utilizes the Sum of Lesser Amounts algorithm's basic concept of selecting the lesser of two compared numbers as an expression of the amount which both numbers have in common.

To perform a Sector overlap analysis, the Sector Analysis module first receives input from the primary fund's portfolio data file. The program then identifies a sector heading in the input file and accumulates the Security Percents for all the securities in that sector. The total of these Security Percents is the Sector Percent for that sector. The program calculates a Sector Percent for each sector for the primary fund.

The Sector Analysis overlap program then receives input from the secondary fund's portfolio data file. As with the primary fund, the program identifies a sector heading in the input file and accumulates the Security Percents for all the securities in that sector. The total of these Security Percents is the Sector Percent for that sector. The program calculates a Sector Percent for each sector for the secondary fund.

The Sector Analysis module then compares the Sector Percent of both funds for each sector to determine the Sector Overlap for each sector. When comparing the primary fund to the secondary fund, the Sector Analysis module follows the same procedure used in the Equity Analysis module— the Sum of Lesser Amounts. However, instead of comparing individual securities, Sector overlap compares sectors. Particularly, Sector overlap compares the investment portfolio securities by accumulating the Security Percents of the individual securities found in each sector heading. Then, the primary fund's Sector Percent is compared to the secondary fund's Sector Percent. The lesser of the two is the Sector Overlap existing between the primary and secondary funds.

These procedures are repeated for the eleven predefined sectors of each fund. If a sector is not represented in the fund's portfolio, in other words, that particular fund has no investments in a particular sector, that sector's percentage of fund total assets is established as zero percent. The sector comparison is repeated for every investment portfolio or fund in the database. The result is the Sector Overlap database.

Referring now to the drawing figures, FIGS. 3, 3A, 3B, 3C, and 3D are flow diagrams summarizing the steps of the Sector Analysis portion or module of the computer program. The flow diagrams of FIGS. 3A, 3B, 3C and 3D are provided to aid in the understanding of the invention but do not disclose every detail of the computer program reproduced in the attached Source Code Appendix.

Referring to FIG. 3A, the Sector module begins at step 200 which sets a "fundlist pointer" to 0. Step 202 then opens the fundlist described in the Equity Analysis module description above. The program then moves to step 204 where the fundlist pointer is incremented by 1. Step 206 then sets a "fund pointer" to 0.

After setting these initial parameters, step 208 opens the investment portfolio from the fundlist pointed to by the fundlist pointer. This investment portfolio is referred to as the primary fund. Step 210 then increments the fund pointer, and step 212 retrieves the fund record or line of data from in the primary fund pointed to by the fund pointer.

Step 214 asks whether the fund record retrieved in step 212 is header information. If the answer to step 214 is yes, the program returns to steps 210–212 to retrieve another line of data or fund record. If the answer to step 214 is no, step 216 then asks whether the last fund record has been read from the primary fund. If the answer to step 216 is yes, the program proceeds to step 262 as described in detail below.

However, if the answer to step 216 is no, the program proceeds to steps 218–260 to determine the percents that the investment portfolio is invested in the various sectors of the economy. In more detail, step 218 asks whether the first fund record, i.e., the first security in the primary fund investment portfolio, is invested in the utility sector. If the answer to step 218 is yes, the Security Percent for that security is added to a "Utility1" record in step 220. However, if the answer to step 218 is no, the program proceeds to step 222 to determine if the first security in the investment portfolio is invested in the energy sector of the economy.

This division of the investment portfolio's fund records is performed in steps 218–260 for every known sector of the economy including utility, energy, financial, industrial cyclical, consumer durables, consumer staples, services, retail, health, technology and other. In more detail, if the answer to step 222 is yes, the Security percent for that security is added to a "Energy1" record in step 224. However, if the answer to step 222 is no, the program proceeds to step 226 to determine if the security in the investment portfolio is invested in the financial sector of the economy. If the answer to step 226 is yes, the Security percent for that security is added to a "Financial 1" record in step 228. However, if the answer to step 226 is no, the program proceeds to step 230 to determine if the security in the investment portfolio is invested in the cyclical industrial sector of the economy. If the answer to step 230 is yes, the Security percent for that security is added to a "Industrial Cyclical 1" record in step 232. However, if the answer to step 230 is no, the program proceeds to step 234 to determine if the security in the investment portfolio is invested in the consumer durable sector of the economy. If the answer to step 234 is yes, the Security percent for that security is added to a "Consumer Durables 1" record in step 236. However, if the answer to step 234 is no, the program proceeds to step 238 to determine if the security in the investment portfolio is invested in the consumer staple sector of the economy. If the answer to step 238 is yes, the Security percent for that security is added to a "Consumer Staples 1" record in step 240. However, if the answer to step 238 is no, the program proceeds to step 242 to determine if the security in the investment portfolio is invested in the service sector of the economy. If the answer to step 242 is yes, the Security percent for that security is added to a "Services 1" record in step 244. However, if the answer to step 242 is no, the program proceeds to step 246 to determine if the security in the investment portfolio is invested in the retail sector of the economy. If the answer to step 246 is yes, the Security percent for that security is added to a "Retail1" record in step 248. However, if the answer to step 246 is no, the program proceeds to step 250 to determine if the security in the investment portfolio is invested in the health sector of the economy. If the answer to step 250 is yes, the Security percent for that security is added to a "Health1" record in step 252. However, if the answer to step 250 is no, the program proceeds to step 254 to determine if the security in the investment portfolio is invested in the technology sector of the economy. If the answer to step 254 is yes, the Security percent for that security is added to a "Technology1" record in step 256. However, if the answer to step 254 is no, the program proceeds to step 258 to determine if the security in the investment portfolio is invested in other sectors of the economy. If the answer to step 258 is yes, the Security percent for that security is added to a "Other1" record in step 260. However, if the answer to step 258 is no, the program proceeds to step 210 to increment the fund pointer and then to step 212 to read the next fund record. Each security held in the investment portfolio is accessed and evaluated to determine the percent that the investment portfolio is invested in the various sectors of the economy. Once every security in the investment portfolio has been accessed and evaluated, i.e., the answer to step 216 is yes, the program proceeds to step 262 where the first or primary portfolio is temporarily closed.

The program then proceeds to steps 264–320 for evaluating a second fund, referred to herein as the secondary investment portfolio or fund. Step 264 first sets a "secondary fund pointer" equal to the fundlist pointer +1, and step 266 sets the fund pointer back to 0. The program then proceeds to step 268 which opens the investment portfolio pointed to by the secondary fund pointer. Step 270 then increments the fund pointer, and step 272 retrieves the first fund record or the first security in this secondary investment portfolio.

Steps 274–322 then perform the same functions as steps 214–262 for the secondary investment portfolio to evaluate each security held in the secondary investment portfolio to determine the percents that the investment portfolio is invested in the various sectors of the economy. In more detail, step 274 asks whether the fund record retrieved in step 272 is header information. If the answer to step 214 is yes, the program returns to steps 270–272 to retrieve another line of data or fund record. If the answer to step 274 is no, step 276 then asks whether the last fund record has been read from the secondary fund. If the answer to step 216 is yes, the program proceeds to step 322 where the second or secondary portfolio is temporarily closed.

However, if the answer to step 276 is no, the program proceeds to steps 278–320 to determine the percents that the investment portfolio is invested in the various sectors of the economy. In more detail, step 278 asks whether the fund record, i.e., the first security in the primary fund investment portfolio, is invested in the utility sector. If the answer to step 278 is yes, the Security Percent for that security is added to a "Utility 2" record in step 280. However, if the answer to step 278 is no, the programs proceeds to step 282 to determine if the first security in the investment portfolio is invested in the energy sector of the economy. If the answer to step 282 is yes, the Security percent for that security is added to a "Energy2" record in step 284. However, if the answer to step 282 is no, the program proceeds to step 286 to determine if the security in the investment portfolio is invested in the financial sector of the economy. If the answer to step 286 is yes, the Security percent for that security is added to a "Financial 2" record in step 288. However, if the answer to step 286 is no, the program proceeds to step 290 to determine if the security in the investment portfolio is invested in the cyclical industrial sector of the economy. If the answer to step 290 is yes, the Security percent for that security is added to a "Industrial Cyclical 2" record in step 292. However, if the answer to step 290 is no, the program proceeds to step 294 to determine if the security in the investment portfolio is invested in the consumer durable sector of the economy. If the answer to step 294 is yes, the Security percent for that security is added to a "Consumer Durables 2" record in step 296. However, if the answer to step 294 is no, the program proceeds to step 298 to determine if the security in the investment portfolio is invested in the consumer staple sector of the economy. If the answer to step 298 is yes, the Security percent for that security is added to a "Consumer Staples 2" record in step 300. However, if the answer to step 298 is no, the program proceeds to step 302 to determine if the security in the investment portfolio is invested in the service sector of the economy. If the answer to step 302 is yes, the Security percent for that security is added to a "Services 2" record in step 304. However, if the answer to step 302 is no, the program proceeds to step 306 to determine if the security in the investment portfolio is invested in the retail sector of the economy. If the answer to step 306 is yes, the Security percent for that security is added to a "Retail2" record in step 308. However, if the answer to step 306 is no, the program proceeds to step 310 to determine if the security in the investment portfolio is invested in the health sector of the economy. If the answer to step 310 is yes, the Security percent for that security is added to a "Health2" record in step 312. However, if the answer to step 310 is no, the program proceeds to step 314 to determine if the security in the investment portfolio is invested in the technology sector of the economy. If the answer to step 314 is yes, the Security percent for that security is added to a "Technology2" record in step 316. However, if the answer to step 314 is no, the program proceeds to step 318 to determine if the security in the investment portfolio is invested in other sectors of the economy. If the answer to step 318 is yes, the Security percent for that security is added to a "Other2" record in step 320. However, if the answer to step 318 is no, the program proceeds to step 270 to increment the fund pointer and then to step 272 to read the next fund record.

Figure 3B:
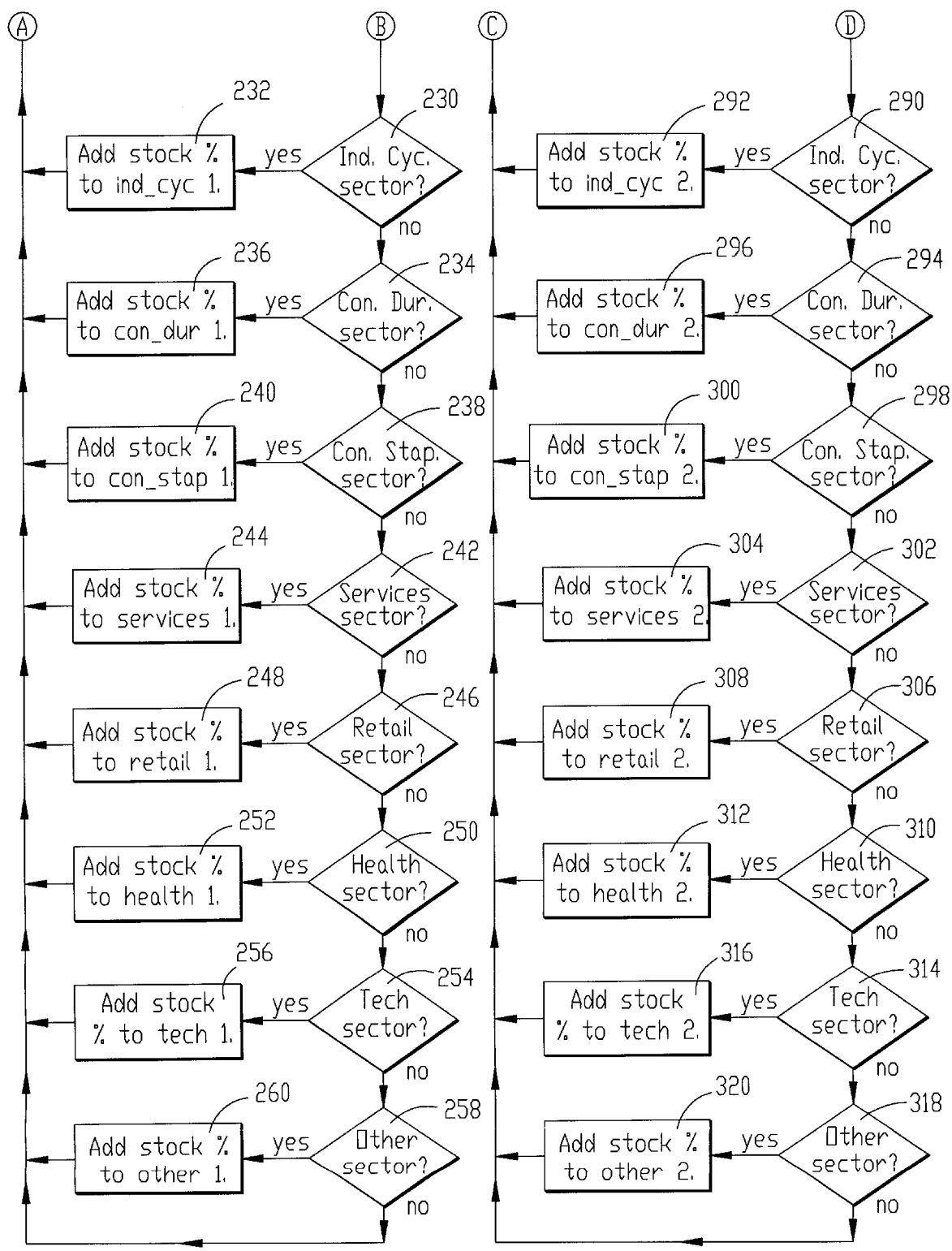
FIG. 3B is a continuation of FIG. 3A.
Figure 3C:
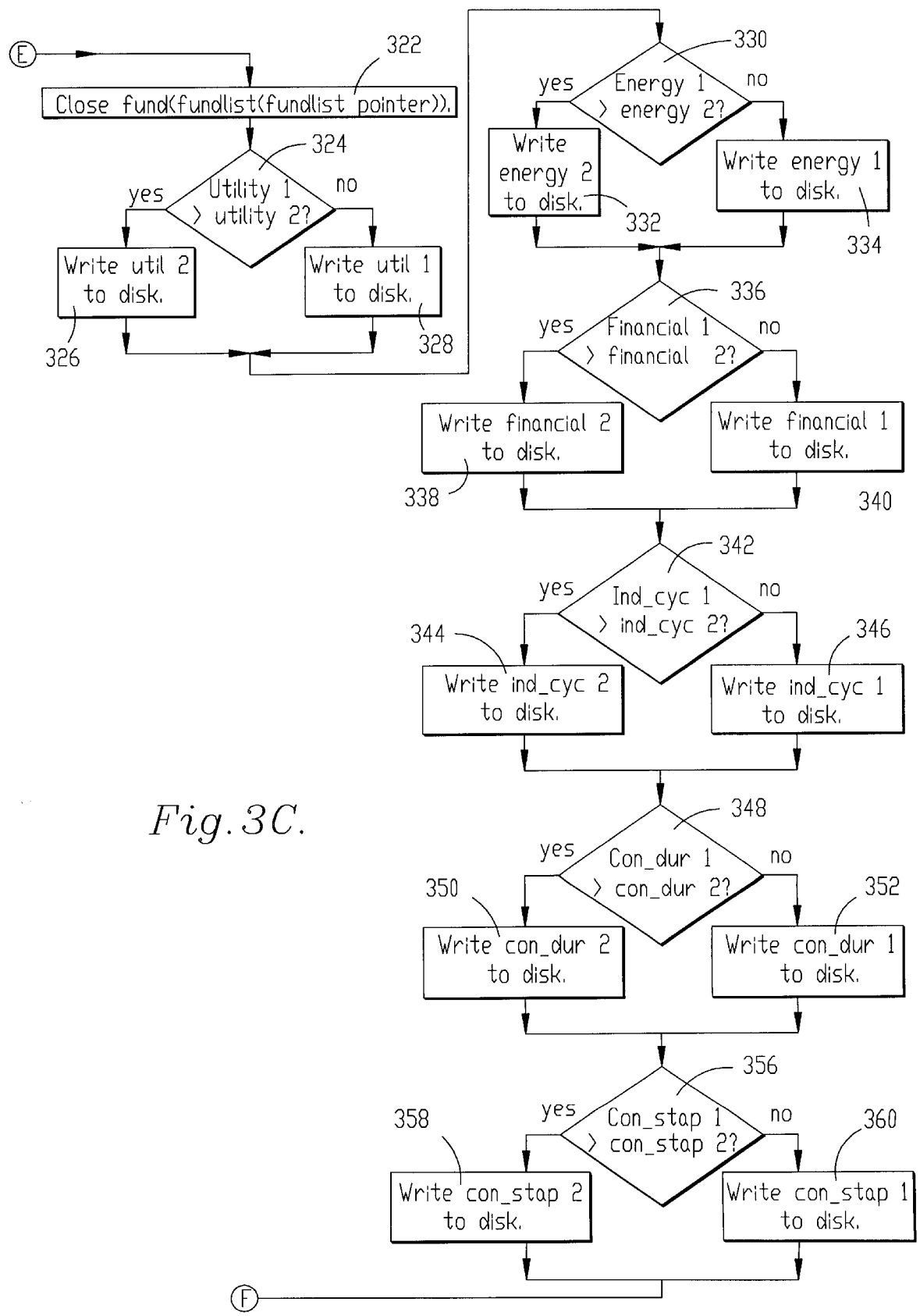
FIG. 3C is a continuation of FIG. 3B.

Referring to FIG. 3C, once the program has completed the evaluation of the two investment portfolios, it moves to steps 324–396 for comparing the two investment portfolios for Sector overlap. Step 324 first compares the utility1 record to the utility2 record. If the utility1 Sector Percent is greater than the utility2 Sector Percent, the program proceeds to step 326 and the utility2 percentage is saved. Conversely, if the utility2 percentage is greater than the utility1 percentage, the program proceeds to step 328 and the utility1 percentage is saved. After either step 326 if yes, or step 328 if no, is completed the program moves to step 330.

Step 330 first compares the energy1 record to the energy2 record. If the energy1 Sector Percent is greater than the energy2 Sector Percent, the program proceeds to step 332 and the energy2 percentage is saved. Conversely, if the energy2 percentage is greater than the energy1 percentage, the program proceeds to step 334 and the energy1 percentage is saved. After either step 332 if yes, or step 334 if no is completed the program moves to step 336.

Step 336 first compares the financial1 record to the financial2 record. If the financial1 Sector Percent is greater than the financial2 Sector Percent, the program proceeds to step 338 and the financial2 percentage is saved. Conversely, if the financial2 percentage is greater than the financial1 percentage, the program proceeds to step 340 and the financial1 percentage is saved. After either step 338 if yes, or step 340 if no is completed the program moves to step 342.

Step 342 first compares the Industrial cyclical1 record to the Industrial cyclical2 record. If the Industrial cyclical1 Sector Percent is greater than the Industrial cyclical2 Sector Percent, the program proceeds to step 344 and the Industrial cyclical2 percentage is saved. Conversely, if the Industrial cyclical2 percentage is greater than the Industrial cyclical1 percentage, the program proceeds to step 346 and the Industrial cyclical1 percentage is saved. After either step 344 if yes, or step 346 if no is completed the program moves to step 348.

Step 348 first compares the consumer durable1 record to the consumer durable2 record. If the consumer durable1 Sector Percent is greater than the consumer durable2 Sector Percent, the program proceeds to step 350 and the consumer durable2 percentage is saved. Conversely, if the consumer durable2 percentage is greater than the consumer durable1 percentage, the program proceeds to step 352 and the consumer durable1 percentage is saved. After either step 350 if yes, or step 352 if no is completed the program moves to step 356.

Step 356 first compares the consumer staple1 record to the consumer staple2 record. If the consumer staple1 Sector Percent is greater than the consumer staple2 Sector Percent, the program proceeds to step 358 and the consumer staple2 percentage is saved. Conversely, if the consumer staple2 percentage is greater than the consumer staple1 percentage, the program proceeds to step 360 and the consumer staple1 percentage is saved. After either step 358 if yes, or step 360 if no is completed the program moves to step 362.

Step 362 first compares the services1 record to the services2 record. If the services1 Sector Percent is greater than the services2 Sector Percent, the program proceeds to step 364 and the services2 percentage is saved. Conversely, if the services2 percentage is greater than the services1 percentage, the program proceeds to step 366 and the services1 percentage is saved. After either step 364 if yes, or step 366 if no is completed the program moves to step 368.

Step 368 first compares the retail1 record to the retail2 record. If the retail1 Sector Percent is greater than the retail2 Sector Percent, the program proceeds to step 370 and the retail2 percentage is saved. Conversely, if the retail2 percentage is greater than the retail1 percentage, the program proceeds to step 372 and the retail1 percentage is saved. After either step 370 if yes, or step 372 if no is completed the program moves to step 374.

Step 374 first compares the health1 record the health2 record. If the health1 Sector Percent is greater than the health2 Sector Percent, the program proceeds to step 376 and the health2 percentage is saved. Conversely, if the health2 percentage is greater than the health1 percentage, the program proceeds to step 378 and the health1 percentage is saved. After either step 376 if yes, or step 378 if no is completed the program moves to step 380.

Step 380 first compares the technology1 record to the technology2 record. If the technology1 Sector Percent is greater than the technology2 Sector Percent, the program proceeds to step 382 and the technology2 percentage is saved. Conversely, if the technology2 percentage is greater than the technology1 percentage, the program proceeds to step 390 and the technology1 percentage is saved. After either step 382 if yes, or step 384 if no, is completed the program moves to step 386.

Step 386 first compares the other1 record to the other2 record. If the other1 Sector Percent is greater than the other2 Sector Percent, the program proceeds to step 388 and the other2 percentage is saved. Conversely, if the other2 percentage is greater than the other1 percentage, the program proceeds to step 390 and the other1 percentage is saved. After either step 388 if yes, or step 390 if no is completed the program moves to step 392.

As illustrated in FIGS. 3C and 3D, steps 330–390 repeat these comparisons for each and every sector of the economy. Step 392 then asks whether the last investment portfolio has been evaluated and compared. If the answer to step 392 is no, the program returns to step 204 in FIG. 3A to retrieve, evaluate, and compare another investment portfolio. If the answer to step 392 is yes, steps 394 and 396 close all files and end the program.

The following is an example of the results obtained by the Sector module for an exemplary primary fund and a secondary fund.

SECTOR OVERLAP

| Primary Fund | | Secondary Fund | | Sector OVERLAP |
|---|---|---|---|---|
| Cyclicals | | | | |
| IBM | 15% | Digital | 6% | |
| Ford | 13% | Kmart | 14% | |
| ATT | 7% | Borders | 9% | |
| GM | 14% | GM | 16% | |
| TOTAL | 49% | TOTAL | 45% | 45% |
| | | Technology | | |
| Microsoft | 8% | Sears | 13% | |
| Tandy | 12% | Tandy | 11% | |
| Chrysler | 7% | Chrysler | 5% | |
| Rolhm | 13% | Honeywell | 6% | |
| TOTAL | 40% | TOTAL | 35% | 35% |
| | | Consumer Staples | | |
| Hershey | 8% | Hershey | 6% | |
| TOTAL | 8% | TOTAL | 6% | 6% |
| | | Retail | | |
| JC Penney | 3% | JC Penney | 2% | |
| | | GAP | 7% | |
| | | McDonalds | 5% | |
| TOTAL | 3% | TOTAL | 14% | 3% |

As shown in the table, the Sector Analysis module identifies the percent that both investment portfolios or funds are invested in various sectors of the economy. The program then compares the investment portfolios to determine the percent of Sector overlap between the portfolios. Thus, in the above example, the Sector Analysis module determines that the primary fund is 49% invested in cyclicals and the secondary fund is 45% invested in cyclicals. The program takes the lesser amount, or 45%, and places it in the total Sector Overlap column for the investment portfolios. These steps are repeated for every sector in which both investment portfolios are invested.

COUNTRY ANALYSIS MODULE

The Country Analysis module or subroutine of the computer program determines the extent that two or more investment portfolios are both invested in securities issued by companies which do business primarily in the same countries. The Country Overlap program first receives input from the country database. The country database contains thousands of stocks, and their countries of origin. The program then identifies the country of each security of each investment portfolio or fund and compares it with each security of every other fund.

The Country overlap program follows the same procedures used in the Sector Analysis program-the Sum of Lesser Amounts. However, instead of applying these procedures to sectors of the economy, Country Analysis overlap applies it to individual countries.

The Country overlap algorithm first determines the percentage that a mutual fund is invested in every country of the world. If a fund has no assets in a country, then the fund's total assets invested in that country is established as zero. The program then compares a primary fund's country percentage to a secondary fund's country percentage. The lesser of the two is the Country overlap existing between the primary and secondary funds. These procedures are repeated for every investment portfolio or fund in the database. The result is the Country Analysis Database, which sets out the extent that every combination of two portfolios in the data base are both invested in securities of companies which do business primarily in each country in the world.

Figure 4:
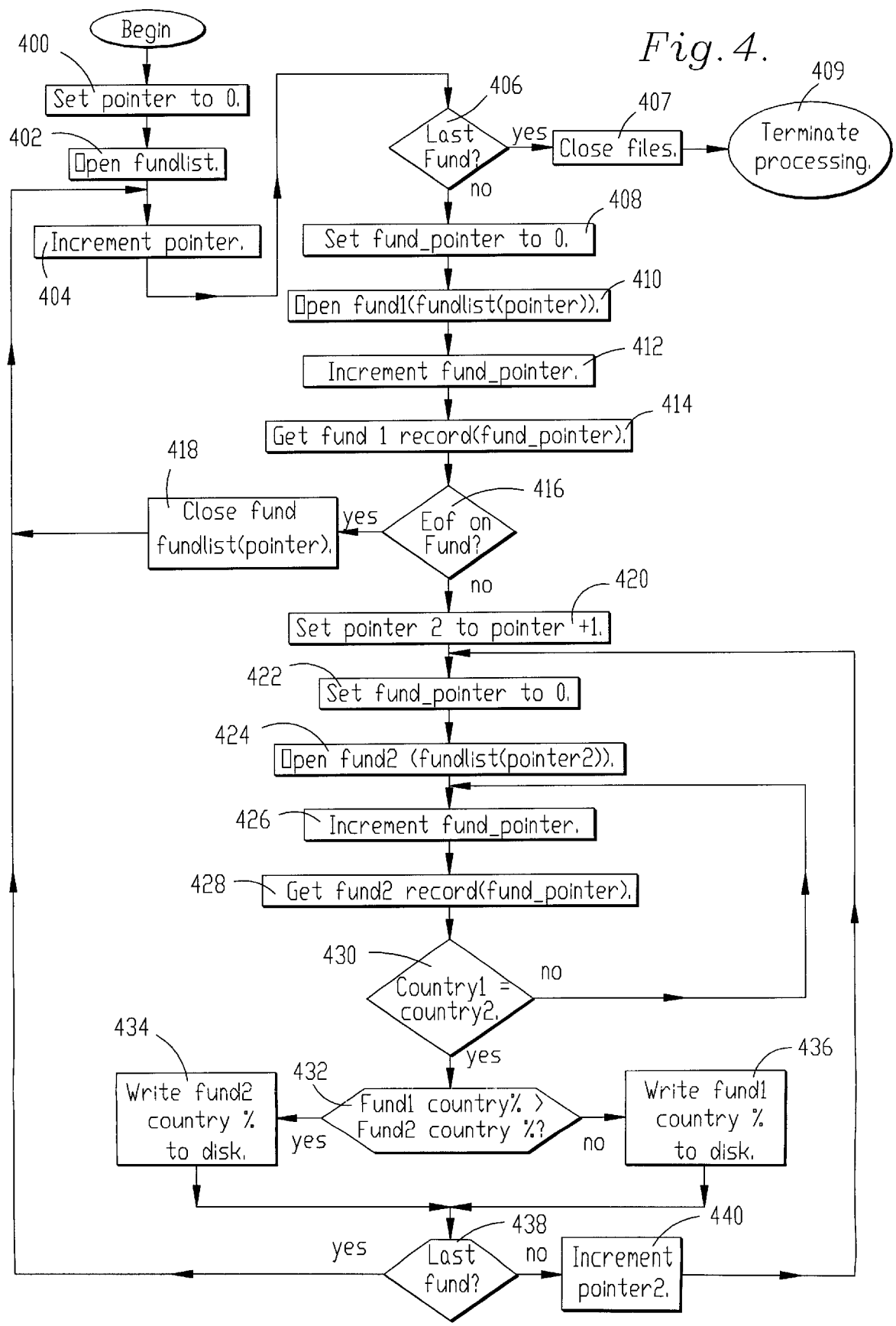
FIG. 4 is a flow chart illustrating the country analysis portion of the computer program.

Referring now to the drawing figures, FIG. 4 is a flow diagram summarizing the steps of the Country Analysis module or subroutine of the computer program. The Country analysis module begins at step 400, which sets a "pointer" to 0. Step 402 then opens the fundlist described above. The program then proceeds to step 404, which increments the pointer set in step 400.

Step 406 then asks whether the last fund in the fundlist has been evaluated. If the answer to step 406 is yes, the program closes all files and ends in steps 407 and 409. However, if the answer to step 406 is no, the program proceeds to step 408 which sets a "fund pointer" to 0. Step 410 then opens the investment portfolio file from the fundlist that is pointed to by the pointer.

Next the program proceeds to step 412 which increments the fund pointer. Step 414 then reads the first fund data record in the current investment portfolio, i.e. the first security in the investment portfolio being evaluated. The data record includes the name of the security, the country of origin for that security, and the percentage that the security forms of its investment portfolio's total assets (its "Security Percent").

Step 416 asks whether the last fund data record in the current investment portfolio has been read. If the answer to step 416 is yes, the program proceeds to step 418, which the closes the investment portfolio and then returns to step 404 for evaluating the next investment portfolio. However, if the answer to step 416 is no, step 420 sets a "pointer2" to equal pointer +1.

The program then proceeds to steps 422 and 424 which reset the fund pointer to 0 and open a second investment portfolio file from the fundlist as pointed to by pointer2. Next, step 426 increments the fund pointer, and step 428 retrieves the fund data record in the second investment portfolio as pointed to by the fund pointer. As described above, the data record includes the name of the security, the country that the security is associated with, and the percentage that the security forms of its investment portfolio's total assets. Alternately, each fund in the data record may include a list of the countries invested in by the fund and the percentage that each country forms of the total fund's assets.

After opening the data records or files for two investment portfolio securities, the program proceeds to steps 430–440 for determining the extent that the two investment portfolios are invested in the same country. Step 430 first asks whether the first security in the first investment portfolio is from the same country as the first security in the second investment portfolio. If the answer to step 430 is no, the program returns to step 426 for incrementing the appropriate pointers so that the first security in the first investment portfolio can be compared with the second security in the second investment portfolio. This loop is repeated until either a match is found or every security in the second investment portfolio is considered.

If the answer to step 430 is yes, step 432 compares the percentages of the two matched securities. If the percentage that the security in the first investment portfolio forms of its investment portfolio's total assets is greater then the percentage that the security in the second investment portfolio forms of its investment portfolio's total assets, step 434 stores or writes the percentage of the second investment portfolio's security in memory. Conversely, if the percentage that the security in the second investment portfolio forms of its investment portfolio's total assets is greater then the percentage that the security in the first investment portfolio forms of its investment portfolio's total assets, step 436 stores or writes the percentage of the first investment portfolio's security in memory.

Step 438 then asks whether the primary investment portfolio has been compared with every other investment portfolio in the database. If the answer to step 438 is no, step 440 increments pointer2 and returns to step 422 for retrieving and comparing the next secondary investment portfolio to the primary investment portfolio.

If the answer to step 438 is yes, the program returns to step 404 for assigning the next investment portfolio as the primary investment portfolio. The program continues this loop until each and every investment portfolio in the database has been compared with every other investment portfolio in the database.

Although the invention has been described with reference to the preferred embodiment illustrated in the attached drawing figures, it is noted that equivalents may be employed and substitutions made herein without departing from the scope of the invention as recited in the claims.

SOURCE CODE APPENDIX

| | |
|---|---|
| APPLICATION: | METHOD AND COMPUTER PROGRAM FOR EVALUATING MUTUAL FUND PORTFOLIOS |
| INVENTOR: | WILLIAM C. CHENNAULT |
| ATTORNEY DOCKET NO. 24142 | |

```
'
' Program Name: OVERLAP Equity Compiler
' This program creates the OVERLAP Equity database. When combined with
' the output from the OVERLAP Sector Compiler it forms the OVERLAP database.
'
' Portfolio holdings ASCII file format
' 1. Fund name
' 2. Text
' 3. Portfolio Date (As of dd/mm/yy)
' 4. Blank line
' 5. Text (Rightmost characters contain number of securities)
' 6. Blank line
' 7. Text
```

SOURCE CODE APPENDIX-continued

```
' 8. Text
' 9. Blank line
' 10. First security
'
DECLARE SUB decap (a$)
DIM fund.nayme$(2000), fund2$(1800, 2)
CLS
a$ = ""
OPEN "i", 1, "c:\ondisc\portlap\fundlist"
'OPEN "i", 1, "fundlist"
no.funds% = 1
WHILE NOT EOF(1)
   INPUT #1, fund.nayme$(no.funds%)
   no.funds% = no.funds% + 1
WEND
no.funds% = no.funds% + 1
CLOSE 1
no.funds% = no.funds% - 2: 'no.funds% contains the number of funds to test
CLS
' write heading to screen
' the following statements are the heart of OVERLAP
fund1.flag% = 0
FOR j% = 1 TO no.funds% - 1: ' outer loop: first fund to next to last
   report$ = fund.nayme$(j%) + ".rpt"
   OPEN "o", 3, report$:] Each fund will have a separate OVERLAP report.
   FOR k% =j% + 1 TO no.funds%
      i$ = INKEY$
      IF i$ = "~" THEN
         CLOSE
         END
      END IF
'*****************************************************************
      CLOSE 2
' This directory name must be changed with each new data set!
'
'
      OPEN "i", 2, "c:\ondisc\portlap\sep94.asc\" + fund.nayme$(k%) + ".asc"
      i% = 1
      a$ = ""
      WHILE a$ <> CHR$(12): 'portfolio portion of file is terminated with a line feed
         LINE INPUT #2,a$
         IF LEN(a$) = 72 THEN
            IF LOF(2) > 75000 GOTO diskbased
            fund2$(i%, 1) = MID$(a$, 11, 30): 'name of stock
            fund2$(i%, 2) = MID$(a$, 60, 5): 'percentage of portfolio
            IF a$ <> "" THEN i% = i% + 1
         END IF
      WEND
      CLOSE2
'*****************************************************************
'This directory name must be changed with each new data set!
'
'
      OPEN "i", 1, "c:\ondisc\portlap\sep94.asc\" + fund.nayme$(j%) + ".asc"
      zz = FRE(zz$)
      IF fund1.flag% <> j% THEN
         PRINT:PRINT fund.nayme$(j%); "vs"
         PRINT #3, fund.nayme$(j%); ",",",";
      END IF
      fund1.flag% = j%
      PRINT TAB(3); fund.nayme$(j%); ":"; fund.nayme$(k%);
      PRINT #3, fund.nayme$(k%); ",";
      a$ = ""
      WHILE a$ <> CHR$(12): 'portfolio portion of file is terminated with a linefeed
         LINE INPUT #1, a$
         IF LEN(a$) = 72 THEN
            fund1.count% = fund1.count% + 1
            fund1.stock$ = MID$(a$, 11, 30)
            fund1.percent$ = MID$(a$, 60, 5)
            FOR array.pos% = 1 TO i%
               IF fund1.stock$ = fund2$(array.pos%, 1) AND fund1.stock$ <> "" THEN
                  IF VAL(fund1.percent$) <= VAL(fund2$(array.pos%, 2)) THEN
                     percent = VAL(fund1.percent$)
                  ELSE
                     percent = VAL(fund2$(array.pos%, 2))
                  END IF
                  overlap = overlap + percent
               END IF
            NEXT array.pos%
```

SOURCE CODE APPENDIX-continued

```
        END IF
    WEND
    CLOSE #1
    PRINT TAB(51); USING "##.##"; overlap;
    PRINT TAB(70); "Array";
    IF k% <> no.funds% THEN
        PRINT #3, USING "##.##"; overlap;
        PRINT #3, ",";
        ELSE PRINT #3, USING "##.##"; overlap;
    END IF
    overlap = 0
    fund1.count% = 0
GOTO skip:
diskbased:
' The code to handle fund1 portfolios with more than 1050 positions
' follows . . .
'****************************************************************
'This directory name must be changed with each new data set!
'
'
        OPEN "i", 1, "c:\ondisc\portlap\sep94.asc\" + fund.nayme$(j%) + ".asc"
        LINE INPUT #1, fund1.nayme$: '1 this line contains the name of the fund
        fund1.nayme$ = LTRIM$(fund1.nayme$)
        fund1.nayme$ = RTRIM$(fund1.nayme$)
        LINE INPUT #1, a$' Line 2: throw this line away
        LINE INPUT #1, fund2.dayte$: 'Line 3: keep this one, it's got the date on the right end
        LINE INPUT #1, a$: 'Line 4: throw this line away
        LINE INPUT #1, a$: 'Line 5: throw this line away (number of securities)
        LINE INPUT #1, a$: LINE INPUT #1, a$: LINE INPUT #1, a$: LINE INPUT #1, a$: 'Lines 6, 7, 8, 9
        IF fund1.flag% <> j% THEN
            PRINT:PRINT fund.nayme$(j%); "vs"
            PRINT #3, fund.nayme$(j%); ",",",";
        END IF
        fund1.flag% = j%
        PRINT TAB(3); fund.nayme$(1%); ":"; fund.nayme$(k%);
        PRINT #3, fund.nayme$(j%); ",";
        WHILE a$ <> CHR$(12): 'portfolio portion of file is terminated with a linefeed
            LINE INPUT #1, a$
            IF LEN(a$) = 72 THEN
                fund1.count% = fund1.count% + 1
                fund1.stock$ = MID$(a$, 11, 30)
                fund1.percent$ = MID$(a$, 60, 5)
            CLOSE 2
'****************************************************************
'This directory name must be changed with each new data set!
'
'
            OPEN "i", 2, "c:\ondisc\portlap\sep94.asc\" + fund.nayme$(k%) + ".asc"
            WHILE fund2.stock$ <> CHR$(12) AND NOT EOF(2)
                LINE INPUT #2, y$
                IF LEN(y$) = 72 THEN
                    fund2.stock$ = MID$(y$, 11, 30): 'name of stock
                    fund2.percent$ = MID$(y$, 60, 5): 'percentage of portfolio
                    IF fund1.stock$ = fund2.stock$ AND fund1.stock$ <> "" THEN
                        IF VAL(fund1.percent$) <= VAL(fund2.percent$) THEN
                            percent = VAL(fund1.percent$)
                        ELSE
                            percent = VAL(fund2.percent$)
                        END IF
                        overlap = overlap + percent
                    END IF
                END IF
            WEND
            CLOSE #2
            END IF
        WEND
        CLOSE #1
        PRINT TAB(51); USING "##.##"; overlap;
        PRINT TAB(70); "Disk";
        IF k% <> no.funds% THEN
            PRINT #3, USING "##.##"; overlap;
            PRINT#3, ",";
            ELSE PRINT #3, USING "##.##"; overlap;
        END IF
        overlap = 0
        fund1.count% = 0
skip:
    NEXT k%
    CLOSE #3
```

SOURCE CODE APPENDIX-continued

```
NEXT j%
CLOSE
'Copyright, 1992, William C. Chennault
'
'Program Name: OVERLAP Sector Compiler
'This program creates the OVERLAP Sector database. When combined with
'the output from the OVERLAP Equity Compiler it forms the OVERLAP database.
DECLARE SUB round (nl)
CLS
DIM fund$(2000)
OPEN "i", 1, "\ondisc\portlap\fundlist"
i% = 1
WHILE NOT EOF(1)
    INPUT #1, fund$(i%)
    i% = i% + 1
WEND
total_funds% = i%- 1
CLOSE
FOR j% = 1 TO total_funds% - 1
        z$ = INKEY$
        IF z$ = "~" THEN
            CLOSE
            END
        END IF
    OPEN "i", 1, "\ondisc\portlap\sep94.asc\" + fund$(j%) + ".asc"
    OPEN "o", 3, "\ondisc\portlap\sep94.asc\sector\" + fund$(j%) + ".rpt"
    LINE INPUT #1, fund1_name$
    LINE INPUT #1, a$' blank line
    LINE INPUT #1, fund1_date$
    FOR i% = 4 TO 9:LINE INPUT #1, a$:NEXT i%
    WHILE NOT EOF(1)
        LINE INPUT #1, sector$
        sector$ = RTRIM$(sector$)
        sector$ = LTRIM$(sector$)
        sector$ = LCASE$(sector$)
        SELECT CASE sector$
          CASE "utilities"
            LINE INPUT #1, sector$'blank line
            sector$ = "x"
            WHILE LEN(sector$) <> 0
              LINE INPUT #1, sector$
              fund1_util = fund1_util + VAL(MID$(sector$, 60, 5))
            WEND
            LINE INPUT #1, sector$'blank line
          CASE "energy"
            LINE INPUT #1, sector$'blank line
            sector$ = "x"
            WHILE LEN(sector$) <> 0
              LINE INPUT #1, sector$
              fund1_energy = fund1_energy + VAL(MID$(sector$, 60, 5))
            WEND
            LINE INPUT #1, sector$
          CASE "financials"
            LINE INPUT #1, sector$'blank line
            sector$ = "x"
            WHILE LEN(sector$) <>0
              LINE INPUT #1, sector$
              fund1_fin = fund1_fin + VAL(MID$(sector$, 60, 5))
            WEND
            LINE INPUT #1, sector$
          CASE "industrial cyclicals"
            LINE INPUT #1, sector$'blank line
            sector$ = "x"
            WHILE LEN(sector$) <> 0
              LINE INPUT #1, sector$
              fund1_cyc = fund1_cyc + VAL(MID$(sector$, 60, 5))
            WEND
            LINE INPUT #1, sector$
          CASE "consumer durables"
            LINE INPUT #1, sector$'blank line
            sector$ = "x"
            WHILE LEN(sector$) <> 0
              LINE INPUT #1, sector$
              fund1_durables = fund1_durables + VAL(MID$(sector$, 60, 5))
            WEND
            LINE INPUT #1, sector$
          CASE "consumer staples"
            LINE INPUT #1, sector$'blank line
            sector$ = "x"
```

SOURCE CODE APPENDIX-continued

```
            WHILE LEN(sector$) <> 0
               LINE INPUT #1, sector$
               fund1_staples = fund1_staples + VAL(MID$(sector$, 60, 5))
            WEND
            LINE INPUT #1, sector$
          CASE "services"
            LINE INPUT #1, sector$'blank line
            sector$ = "x"
            WHILE LEN(sector$) <> 0
               LINE INPUT #1, sector$
               fund1_services = fund1_services + VAL(MID$(sector$, 60, 5))
            WEND
            LINE INPUT #1, sector$
          CASE "retail"
            LINE INPUT #1, sector$'blank line
            sector$ = "x"
            WHILE LEN(sector$) <> 0
               LINE INPUT #1, sector$
               fund1_retail = fund1_retail + VAL(MID)$(sector$, 60, 5))
            WEND
            LINE INPUT #1, sector$
          CASE "health"
            LINE INPUT #1, sector$'blank line
            sector$ = "x"
            WHILE LEN(sector$) <> 0
               LINE INPUT #1, sector$
               fund1_health = fund1_health + VAL(MID$(sector$, 60, 5))
            WEND
            LINE INPUT #1, sector$
          CASE "technology"
            LINE INPUT #1, sector$'blank line
            sector$ = "x"
            WHILE LEN(sector$) <> 0
               LINE INPUT #1, sector$
               fund1_tech = fund1_tech + VAL(MID$(sector$, 60, 5))
            WEND
            LINE INPUT #1, sector$
          CASE "other"
            LINE INPUT #1, sector$'blank line
            sector$ = "x"
            WHILE LEN(sector$) <> 0
               LINE INPUT #1, sector$
               fund1_other = fund1_other + VAL(MID$(sector$, 60, 5))
            WEND
            LINE INPUT #1, sector$
       END SELECT
WEND
CLOSE #1
FOR k% = j% + 1 TO total_funds%
    z$ = INKEY$
    IF z$ = "~" THEN
        CLOSE
        END
    END IF
    OPEN "i", 2, "\ondisc\portlap\sep94.asc\" + fund$(k%) + ".asc"
    LINE INPUT #2, fund2_name$
    LINE INPUT #2, a$'blank line
    LINE INPUT #2, fund1_date$
    FOR i% = 4 TO 9:LINE INPUT #2, a$:NEXT i%
    WHILE NOT EOF(2)
        LINE INPUT #2, sector$
        sector$ = RTRIM$(sector$)
        sector$ = LTRIM$(sector$)
        sector$ = LCASE$(sector$)
        SELECT CASE sector$
          CASE "utilities"
            LINE INPUT #2, sector$'blank line
            sector$ = "x"
            WHILE LEN(sector$) <> 0
               LINE INPUT #2, sector$
               fund2_util = fund2_util + VAL(MID$(sector$, 60, 5))
            WEND
            LINE INPUT#2, sector$'blank line
          CASE "energy"
            LINE INPUT #2, sector$'blank line
            sector$ = "x"
            WHILE LEN(sector$) <> 0
               LINE INPUT #2, sector$
               fund2_energy = fund2_energy + VAL(MID$(sector$, 60, 5))
```

SOURCE CODE APPENDIX-continued

```
            WEND
            LINE INPUT #2, sector$
         CASE "financials"
            LINE INPUT #2, sector$'blank line
            sector$ = "x"
            WHILE LEN(sector$) <> 0
               LINE INPUT #2, sector$
               fund2_fin = fund2_fin + VAL(MID$(sector$, 60, 5))
            WEND
            LINE INPUT #2, sector$
         CASE "industrial cyclicals"
            LINE INPUT #2, sector$'blank line
            sector$ = "x"
            WHILE LEN(sector$) <> 0
               LINE INPUT #2, sector$
               fund2_cyc = fund2_cyc + VAL(MID$(sector$, 60, 5))
            WEND
            LINE INPUT #2, sector$
         CASE "consumer durables"
            LINE INPUT #2, sector$'blank line
            sector$ = "x"
            WHILE LEN(sector$) <> 0
               LINE INPUT #2, sector$
               fund2_durables = fund2_durables + VAL(MID$(sector$, 60, 5))
            WEND
            LINE INPUT #2, sector$
         CASE "consumer staples"
            LINE INPUT #2, sector$'blank line
            sector$ = "x"
            WHILE LEN(sector$) <> 0
               LINE INPUT #2, sector$
               fund2_staples = fund2_staples + VAL(MID$(sector$, 60, 5))
            WEND
            LINE INPUT #2, sector$
         CASE "services"
            LINE INPUT #2, sector$'blank line
            sector$ = "x"
            WHILE LEN(sector$) <> 0
               LINE INPUT #2, sector$
               fund2_services = fund2_services + VAL(MID$(sector$, 60, 5))
            WEND
            LINE INPUT #2, sector$
         CASE "retail"
            LINE INPUT #2, sector$'blank line
            sector$ = "x"
            WHILE LEN(sector$) <> 0
               LINE INPUT #2, sector$
               fund2_retail = fund2_retail + VAL(MID$(sector$, 60, 5))
            WEND
            LINE INPUT #2, sector$
         CASE "health"
            LINE INPUT #2, sector$'blank line
            sector$ = "x"
            WHILE LEN(sector$) <> 0
               LINE INPUT #2, sector$
               fund2_health = fund2_health + VAL(MID$(sector$, 60, 5))
            WEND
            LINE INPUT #2, sector$
         CASE "technology"
            LINE INPUT #2, sector$'blank line
            sector$ = "x"
            WHILE LEN(sector$) <> 0
               LINE INPUT #2, sector$
               fund2_tech = fund2_tech + VAL(MID$(sector$, 60, 5))
            WEND
            LINE INPUT #2, sector$
         CASE "other"
            LINE INPUT #2, sector$'blank line
            sector$ = "x"
            WHILE LEN(sector$) <> 0
               LINE INPUT #2, sector$
               fund2_other = fund2_other + VAL(MID$(sector$, 60, 5))
            WEND
            LINE INPUT #2, sector$
      ENDSELECT
WEND
CLOSE #2
IF fund1_util <= fund2_util THEN
      util = fund1_util
```

SOURCE CODE APPENDIX-continued

```
        ELSE util = fund2_util
END IF
IF fund1_energy <= fund2_energy THEN
        energy = fund1_energy
        ELSE energy = fund2_energy
END IF
IF fund1_fin <= fund2_fin THEN
        fin = fund1_fin
        ELSE fin = fund2_fin
END IF
IF fund1_cyc <= fund2_cyc THEN
        cyc = fund1_cyc
        ELSE cyc = fund2_cyc
END IF
IF fund1_durables <= fund2_durables THEN
        durables = fund1_durables
        ELSE durables = fund2_durables
END IF
IF fund1_staples <= fund2_staples THEN
        staples = fund1_staples
        ELSE staples = fund2_staples
END IF
IF fund1_services <= fund2_services THEN
        services = fund1_services
        ELSE services = fund2_services
END IF
IF fund1_retail <= fund2_retail THEN
        retail = fund1_retail
        ELSE retail = fund2_retail
END IF
IF fund1_health <= fund2_health THEN
        health = fund1_health
        ELSE health = fund2_health
END IF
IF fund1_tech<= fund2_tech THEN
        tech = fund1_tech
        ELSE tech = fund2_tech
END IF
IF fund1_other <= fund2_other THEN
        other = fund1_other
        ELSE other = fund2_other
END IF
'give me something to look at . . .
    PRINT fund$(j%); "vs"; fund$(k%)
    CALL round(util): PRINT #3, LTRIM$(RTRIM$(STR$(util))); ",";
    CALL round(energy): PRINT #3, LTRIM$(RTRIM$(STR$(energy))); ",";
    CALL round(fin): PRINT #3, LTRIM$(RTRIM$(STR$(fin))); ",";
    CALL round(cyc): PRINT #3, LTRIM$(RTRIM$(STR$(cyc)); ",";
    CALL round(durables): PRINT #3, LTRIM$(RTRIM$(STR$(durables))); ",";
    CALL round(staples): PRINT #3, LTRIM$(RTRIM$(STR$(staples))); ",";
    CALL round(services): PRINT #3, LTRIM$(RTRIM$(STR$(services))); ",";
    CALL round(retail): PRINT #3, LTRIM$(RTRIM$(STR$(retail))); ",";
    CALL round(health): PRINT #3, LTRIM$(RTRIM$(STR$(health))); ",";
      CALL round(tech): PRINT #3, LTRIM$(RTRIM$(STR$(tech))); ",";
      CALL round(other): PRINT #3, LTRIM$(RTRIM$(STR$(other)))
      ' clear fund two variables
      fund2_util = 0
      fund2_energy = 0
      fund2_fin = 0
      fund2_cyc = 0
      fund2_durables = 0
      fund2_staples = 0
      fund2_services = 0
      fund2_retail = 0
      fund2_health = 0
      fund2_tech = 0
      fund2_other = 0
      ' clear sector overlap variables
      util = 0
      energy = 0
      fin = 0
      cyc = 0
      durables = 0
      staples = 0
      services = 0
      retail = 0
      health = 0
      tech = 0
      other = 0
```

SOURCE CODE APPENDIX-continued

```
  NEXT k%
' clear fund one variables
  fund1_util = 0
  fund1_energy = 0
  fund1_fin = 0
  fund1_cyc = 0
  fund1_durables = 0
  fund1_staples = 0
  fund1_services = 0
  fund1_retail = 0
  fund1_health = 0
  fund1_tech = 0
  fund1_other = 0
  CLOSE #3
NEXT j%
CLOSE
END
SUB round (n)
  IF n - INT(n) >= .5 THEN
    n = INT(n) + 1
    ELSE n = INT(n)
  END IF
END SUB
' This program combines the database created by the OVERLAP Equity Compiler with
' the database created by the OVERLAP Sector Compiler. The result is the OVERLAP
' database.
DECLARE SUB round (n)
CLS
OPEN "i", 1, "\ondisc\portlap\fundlist"
WHILE NOT EOF(1)
  INPUT#1, f$
  PRINT f$
  OPEN "i", 2, "\ondisc\portlap\sep94.asc\sector\" + f$ + ".rpt"
  OPEN "i", 3, "\ondisc\portlap\" + f$ + ".rpt"
  INPUT #3, a$, b$' toss these two
  OPEN "o", 4, "\ondisc\portlap\fix\" + f$ + ".rpt"
  WHILE NOT EOF(2)
    FOR i% = 1 TO 11:INPUT #2, n$: PRINT #4, n$; ","; :NEXT i%
    INPUT #3, fund$, olap$
    n = VAL(olap$)
    CALL round(n)
    olap$ = LTRIM$(STR$(n))
    PRINT #4, olap$
  WEND
  CLOSE #2, 3, 4
WEND
SUB round (n)
  IF n - INT(n) >= .5 THEN
    n = INT(n) + 1
    ELSE n = INT(n)
  END IF
END SUB
```

We claim:

1. A computer program stored on a computer-readable memory device for directing a computer for evaluating a plurality of investment portfolios each including a plurality of securities, said computer program comprising:
    access means for accessing a first investment portfolio data record including the investment attributes of a first investment portfolio and for accessing a second investment portfolio data record including the investment attributes of a second investment portfolio; and
    evaluating means for evaluating said first and second investment portfolios, said evaluating means including investment attribute comparing means for comparing the investment attributes of said first investment portfolio with the investment attributes of said second investment portfolio for identifying matching investment attributes that are common to both of said first and second investment portfolios.

2. The computer program as set forth in claim 1, said investment attributes including country percentages for each of said first and second investment portfolios indicating the percentage of the total assets of said first and second investment portfolios that are invested in particular countries, said investment attribute comparing means including country calculating means for calculating the extent said first and second investment portfolios are invested in the same country.

3. The computer program as set forth in claim 1, said investment attributes including sector percentages for each of said first and second investment portfolios indicating the percentage of the total assets of said first and second investment portfolios that are invested in particular sectors of the economy, said investment attribute comparing means including sector calculating means for calculating the extent said first and second investment portfolios are invested in the same sector of the economy.

4. The computer program as set forth in claim 3, said sectors of the economy including utility, energy, financial, industrial cyclical, consumer durables, consumer staples, services, retail, health and technology.

5. The computer program as set forth in claim 1, said investment portfolios including stock mutual funds.

6. The computer program as set forth in claim 5, said securities including stocks.

7. The computer program as set forth in claim 1, said investment portfolios including money market funds.

8. The computer program as set forth in claim 7, said securities including government notes.

9. The computer program as set forth in claim 1, said investment portfolios including bond funds.

10. The computer program as set forth in claim 9, said securities including bonds.

11. The computer program as set forth in claim 1, said investment attributes including a list of the securities in each of said first and second investment portfolios, said investment attribute comparing means including means for identifying securities that are in both of said first and second investment portfolios.

12. The computer program as set forth in claim 11, said investment attributes including an asset percentage for each of the securities indicating the percentage that each of the securities forms of the total assets of its respective investment portfolio, said investment attribute comparing means including asset percentage comparing means for comparing the asset percentages for the securities that are identified as being in both of said first and second investment portfolios determining the lower of the asset percentages for pair of matching securities.

13. The computer program as set forth in claim 12, said investment attribute comparing means further including aggregating means for aggregating said lower asset percentages for each of the matching pairs of securities.

14. A computer program stored on a computer-readable memory device including a computer program for directing a computer for evaluating a plurality of investment portfolios each including a plurality of securities, said computer program comprising:

a first investment portfolio data record including a list of the securities in a first investment portfolio and an asset percentage for each of said first investment portfolio securities indicating the percentage that each of said first investment portfolio securities forms of the total assets of said first investment portfolio;

a second investment portfolio data record including a list of the securities in a second investment portfolio and an asset percentage for each of said second investment portfolio securities indicating the percentage that each of said second investment portfolio securities forms of the total assets of said second investment portfolio; and diversity determining means for determining the extent of diversity between said first and second investment portfolios, said diversity determining means including-comparing means for comparing said first investment portfolio data record with said second investment portfolio data record for identifying matching pairs of securities that are in both of said first and second investment portfolios, comparing means for comparing the percentages that the securities in said matching pairs of securities forms of their respective investment portfolios and for determining the lower of said percentages for each matching pair of securities, and aggregating means for aggregating said lower percentages for each of said matching pairs of securities for determining the lack of diversity between said first and second investment portfolios.

* * * * *